(12) United States Patent
Narita

(10) Patent No.: US 11,740,846 B2
(45) Date of Patent: Aug. 29, 2023

(54) PRINTING SYSTEM AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Kenju Narita, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 17/695,957

(22) Filed: Mar. 16, 2022

(65) Prior Publication Data
US 2022/0300228 A1     Sep. 22, 2022

(30) Foreign Application Priority Data

Mar. 19, 2021   (JP) .................................. 2021-045319
Mar. 19, 2021   (JP) .................................. 2021-045321

(51) Int. Cl.
   *G06F 3/12*   (2006.01)
(52) U.S. Cl.
   CPC .......... *G06F 3/1257* (2013.01); *G06F 3/1204* (2013.01); *G06F 3/1205* (2013.01); *G06F 3/1293* (2013.01)
(58) Field of Classification Search
   CPC combination set(s) only.
   See application file for complete search history.

(56) References Cited

U.S. PATENT DOCUMENTS

| | | | |
|---|---|---|---|
| 2010/0069008 A1* | 3/2010 | Oshima | H04W 4/02 455/41.3 |
| 2012/0020694 A1* | 1/2012 | Shirata | G03G 15/5016 399/81 |
| 2014/0078549 A1* | 3/2014 | Amiya | H04N 1/00411 358/1.15 |
| 2018/0113655 A1* | 4/2018 | Sawata | G06F 3/1258 |
| 2018/0275931 A1* | 9/2018 | Saigusa | G06F 3/1284 |
| 2020/0319830 A1* | 10/2020 | Kaneda | G06F 3/1238 |
| 2021/0117135 A1 | 4/2021 | Suzuki | |
| 2022/0038604 A1* | 2/2022 | Yamada | H04N 1/6058 |

FOREIGN PATENT DOCUMENTS

| | | |
|---|---|---|
| JP | 2015060312 A | 3/2015 |
| JP | 2016055633 A | 4/2016 |
| JP | 2017021690 A | 1/2017 |
| JP | 2020004254 A | 1/2020 |

* cited by examiner

*Primary Examiner* — Helen Zong
(74) *Attorney, Agent, or Firm* — Scully, Scott, Murphy & Presser, PC

(57) ABSTRACT

A printing system includes an information processing device, and a printer in which particular print settings are stored. The printer is configured to change currently set print setting to the particular print settings in response to receipt of instruction to change a state of print setting to a particular state. The information processing device is configured to perform obtaining, from the printer, the particular print settings, when an editing application implemented in the information processing device outputs a display instruction instructing the general-use printing program to display a setting screen used to receive print settings, displaying the setting screen with use of a user interface of the information processing device, and reflecting the particular print settings obtained in the obtaining to the setting screen.

20 Claims, 16 Drawing Sheets

NOTIFICATION SCREEN: PRINTER-SIDE-SETTING

| | |
|---|---|
| SHEET SIZE | ● A4   ○ A3   ○ B5 |
| SHEET TYPE | ● NOMAL  ○ POSTCARD |
| PRINT QUALITY | ● NOMAL  ○ HIGH QUALITY |
| DUPLEX PRINTING | ● NO    ○ YES |
| AGGREGATE PRINTING | ○ NO   ● 2in1   ○ 4in1 |
| COMPOSITE PRINTING | ○ NO    ● YES   SELECTION OF COMPOSITE IMAGE [CONFIDENTIAL ▼] |
| COLOR PRINTING | ● COLOR   ○ MONOCHROMATIC |
| NUMBER OF COPIES | [ 1 ] COPIES |
| SHEET FEED TRAY | ● TRAY 1   ○ TRAY 2 |
| SHEET DISCHARGE TRAY | ● UPPER TRAY   ○ REAR TRAY |
| COLOR COMPENSATION | ○ NO    ● YES   [HUE SETTING] |
| TONER MODE | ○ OFF   ● ON |
| ECO MODE | ○ OFF   ● ON |
| ACCUMULATION PRINTING | ○ OFF   ● ON |

( END )  ( APPLY )
  321        323

DETAILED SETTINGS — 1230 — 13

| Setting | | | |
|---|---|---|---|
| SHEET SIZE | ● A4 | ○ A3 | ○ FOLLOW PRINTER-SIDE-SETTING |
| NUMBER OF COPIES | [ 1 ] COPIES | ○ FOLLOW PRINTER-SIDE-SETTING | |
| SHEET FEED TRAY | ● TRAY 1 | ○ TRAY 2 | ○ FOLLOW PRINTER-SIDE-SETTING |
| SHEET DISCHARGE TRAY | ○ UPPER TRAY | ○ REAR TRAY | ● FOLLOW PRINTER-SIDE-SETTING |
| PRINT RANGE | ● ALL | ○ CURRENT PAGE | ○ PRINT RANGE [ ]  ○ FOLLOW PRINTER-SIDE-SETTING |
| DUPLEX PRINTING | ○ NO | ○ YES | ● FOLLOW PRINTER-SIDE-SETTING |
| AGGREGATE PRINTING | ● NO | ○ 2in1 | ○ 4in1  ○ FOLLOW PRINTER-SIDE-SETTING |
| TONER SAVE | ● OFF | ○ ON | ○ FOLLOW PRINTER-SIDE-SETTING |
| ECO MODE | ○ OFF | ○ ON | ● FOLLOW PRINTER-SIDE-SETTING |
| ACCUMULATION PRINTING | ● OFF | ○ ON | ○ FOLLOW PRINTER-SIDE-SETTING |

[ SET ] — 232
[ RETURN ] — 233
[ CHECK PRINTER-SIDE-SETTING ] — 1235
[ REGISTER WITH PRINTER ] — 236

PRINTING SYSTEM AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Applications No. 2021-045319 and No. 2021-045321, both filed on Mar. 19, 2021. The entire subject matters of the applications are incorporated herein by reference.

BACKGROUND

The present disclosures relate to a printing system and a non-transitory computer-readable recording medium containing computer-executable instructions realizing a supporting program that supports controlling of a printer of the printing system.

In recent years, a technology to control printers by means of a printing program that is built into the operating system (OS) as standard, without using a printer driver, has been put into practical use. In this technology, the OS associates the printer with the OS standard printing program, and thereafter, when printing instructions are received for the printer, the printer can perform printing under control of the OS standard printing program without using a printer driver.

There is also known a technology for storing particular print settings and using the print settings when printing is performed. For example, there is known a configuration in which a particular print setting can be registered, and when a print job setting and the registered print setting are different, a user is asked, through an operation panel, whether to continue printing or not.

SUMMARY

There are generally multiple types of print settings stored in the printer, which include user-specified print settings to be registered by a user operation, and default print settings having been stored in the printer from the factory and unchangeable by a user operation. When the printer receives a reset instruction to reset the print settings, the print settings are changed to the default print settings. The setting items included in the default print settings include, in addition to items determined for each model, items to be customized based on, for example, an installation status of optional parts or particular specification depending on countries where the printer is used.

On the other hand, when the information processing device receives print settings by the OS standard print program, the default print settings stored in the printer are not referred to, and the default print settings set, for example, in the OS standard print program are initially displayed. For example, the default print settings set in the OS standard printing program are initially displayed. Therefore, when, for example, the default print settings of the printer are customized ones, it is difficult to reflect the customized default print settings when inputting the print settings in the information processing device. As a result, in order to instruct the printer to print with the customized default print settings from the information processing device, the user has to change the print settings to be the same settings as the customized default print settings on the information processing device.

When receiving print settings in an information processing device, some printer drivers are configured to accept a setting which indicates that the printer is to perform printing in accordance with print settings registered in the printer as a selection of print settings. When the printer receives a print job with such a setting (e.g., a setting indicating "print in accordance with print settings stored in the printer"), the printer performs printing according to the print settings registered in the printer.

However, when the print settings are received by the information processing device, the user may not know what print settings are registered in the printer itself. Therefore, when the user selects a setting that indicates that the printer is to follow the print settings registered in the printer, there is a possibility that printing which the user may not intend may be performed. In addition, the OS-standard general-purpose printing program does not generally allow the user to set print settings that are registered in the printer.

According aspects of the present disclosure, there is provided a non-transitory computer-readable recording medium containing computer-executable instructions realizing a supporting program executable for a computer of an information processing device to which a printer is connectable, the printer storing particular print settings, the supporting program being configured to support a general-use printing program implemented, in advance, in an operating system of the information processing device. The computer-executable instructions cause, when executed by the computer, the information processing device to perform obtaining, from the printer, the particular print settings stored in the printer, when an editing application implemented in the information processing device outputs a display instruction instructing the general-use printing program to display a setting screen used to receive print settings to be used for printing by the printer, displaying the setting screen with use of a user interface of the information processing device, and reflecting the particular print settings obtained in the obtaining to the setting screen.

BRIEF DESCRIPTION OF THE DRAWING

FIG. 11 shows an example of the notification screen.

FIG. 12 shows an example of a detailed setting screen.

DESCRIPTION OF THE EMBODIMENTS

Hereinafter, a personal computer (hereinafter referred to as "PC") using a supporting program according to the present embodiment will be described in detail with reference to the accompanying drawings. The present disclosures relate to a printing system including a printer having a printing function and a supporting program executed on the PC connected to the printer.

First Embodiment

Figure 1:
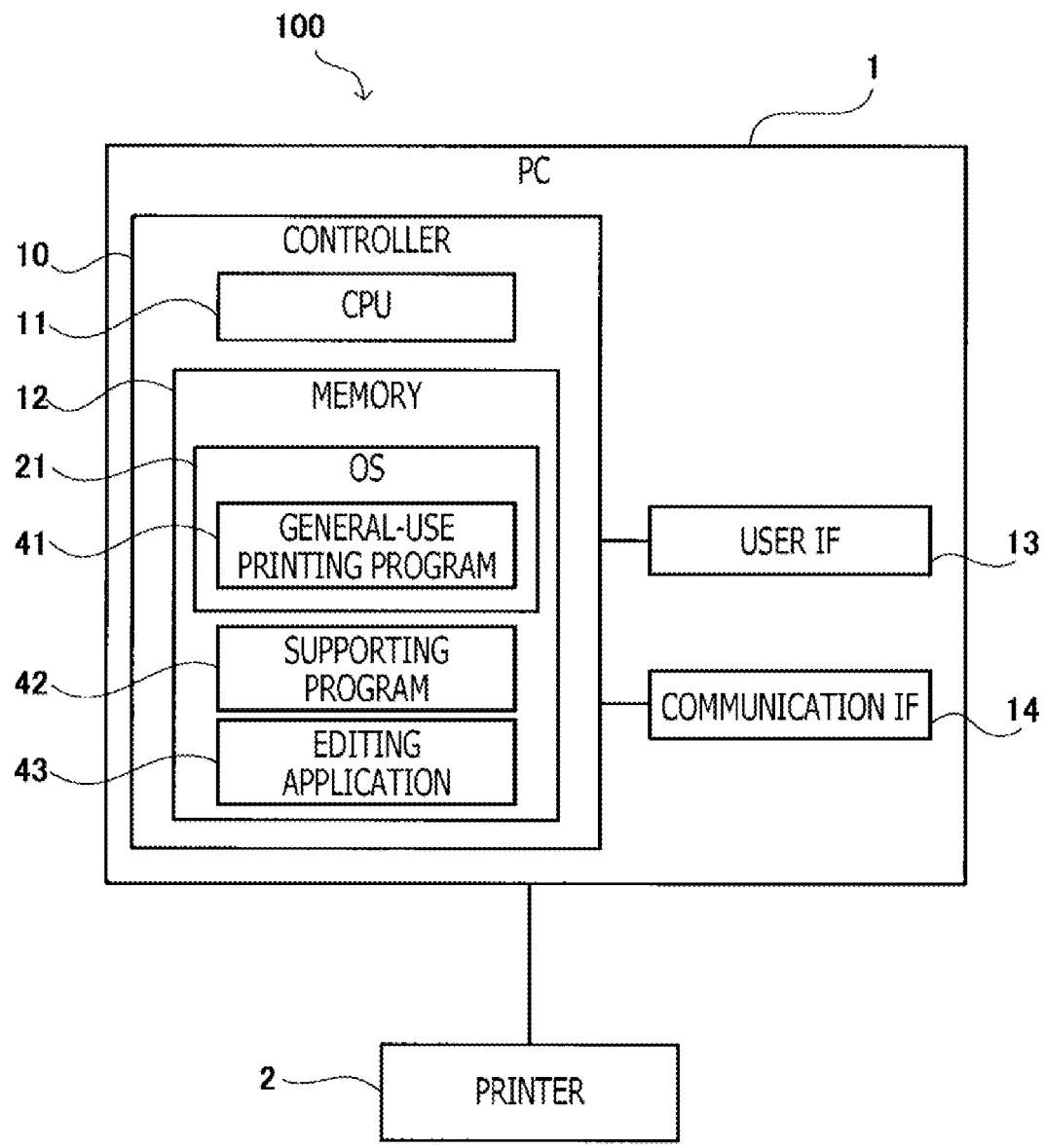
FIG. 1 is a block diagram showing an electrical configuration of a PC.

Initially, a first embodiment will be described. A printing system 100 according to the first embodiment includes a PC 1 and a printer 2 as shown in FIG. 1. The PC 1 is an example of an "information processing device," and the printer 2 is an example of a device having a printing function. The PC 1 and the printer 2 are connected communicatably. The printer 2 in this embodiment is configured, for example, to receive print data from the PC 1 or the like and execute printing based on the received print data.

As shown in FIG. 1, the PC 1 according to the present embodiment has a controller 10 including a CPU 11 and a memory 12. The CPU 11 is an example of a computer. The PC 1 also has a user interface (hereinafter referred to as a "user IF") 13 and a communication interface (hereinafter referred to as a "communication IF") 14, which are electrically connected to the controller 10. It is noted that the term "controller" of the controller 10 in FIG. 1 is a generic term representing hardware and software used to control the PC 1, and does not necessarily represent a single piece of hardware that actually exists in the PC 1.

The CPU 11 is configured to execute various processes according to the program read from the memory 12 and/or based on the user's operation. The memory 12 contains various programs and data, including various application programs (hereinafter referred to as "applications"). The memory 12 is also used as a work area when various processes are executed by the CPU 11. A buffer provided to the CPU 11 is also an example of a memory. The example of memory 12 is not necessarily limited to a ROM, a RAM, an HDD, and the like built in the PC 1, but may optionally include non-transitory computer-readable and computer-writable storage media from/to which the CPU 11 can read/write data. An example of such a storage media may include a CD-ROM, a DVD-ROM and the like.

The user IF 13 includes hardware for displaying a screen configured to inform a user of information and hardware configured to receive operations by the user. The user IF 13 may be a set of a display configured to display information and a mouse, keyboard, or the like with an input reception function. Alternatively, the user IF 13 may be a touchscreen panel having both a displaying function and an input receiving function.

The communication IF 14 includes hardware configured to communicate with external devices such as the printer 2. A communication standard employed by the communication IF 14 includes Ethernet (registered trademark), Wi-Fi (registered trademark), and/or USB. The PC 1 may include multiple communication IFs 14 respectively supporting multiple communication standards.

The memory 12 of the PC 1 contains an operating system (hereinafter referred to as an "OS") 21 including a general-use printing program 41, a supporting program 42, and an editing application, as shown in FIG. 1. The supporting program 42 is an example of a supporting program. The editing application 43 is an example of an editing application program. The OS 21 is, for example, Windows (registered trademark), macOS (registered trademark), Linux (registered trademark), iOS (registered trademark) Linux (registered trademark), or Android (registered trademark).

The general-use printing program 41 is an OS standard program configured to cause various printers such as the printer 2 to execute printing based on user instructions. The general-use printing program 41 according to the present embodiment is a program that includes a function of generating intermediate image data based on the image data to be printed.

The general-use printing program 41 supports functions that can be commonly used by multiple models of printers provided by various printer vendors. It is noted that the general-use printing program 41 does not support all of the functions that are intrinsic to the various printers, but the functions the general-purpose printer supports are limited to general functions.

The supporting program 42 is a program or group of programs configured to execute processes based on instructions from the OS 21 in association with a process performed by the general-use printing program 41. The supporting program 42 according to the present embodiment corresponds to the model of the printer 2 connected to the PC 1, and is launched from the general-use printing program 41, when, for example, the instruction to cause the printer 2 to execute printing is received using the general-use printing program 41. The supporting program 42 is referred to as, for example, a hardware support application (abbreviated as "HSA").

The supporting program 42 is capable of receiving multiple types of instructions from the general-use printing program 41 and executing various processes based on the received instructions. It is noted that the supporting program 42 may be a combination of a plurality of programs respectively configured to receive execution instructions, or the supporting program 42 may be a single program that can execute different processes depending on the instructions.

The supporting program 42 may be a program prepared for each type of printer by the vendor of the printer. For example, a supporting program for an inkjet printer and a supporting program for a laser printer may be prepared, respectively. When a new printer is connected to the PC 1, the OS of the PC 1 downloads an appropriate supporting program from a server or the like according to the type of the connected printer and embeds the downloaded supporting program into the information processing device itself. Then, the OS 21 stores identification information of the embedded supporting program in the memory 12 with associating the identification information with the printer information of the newly connected printer. It is noted that the supporting program may not be necessarily prepared for each type of printer, but for each printer model or series of printer models.

The editing application 43 is an application configured, for example, to create and edit image data and document data. The editing application 43 may be, for example, Word or PowerPoint provided by Microsoft (registered trademark), or an application provided by a vendor of the printer 2. The editing application 43 is configured to receive user operations including instructions to cause the printer 2 to perform a particular operation. Concretely, the editing application 43 is configured to receive, via the user IF 13, an instruction to cause the printer 2 to execute printing.

The printer 2 is configured to store default print settings in the memory provided therein. The printer 2 can change the print settings via the operation panel thereof or a management device that manages the printer 2. The printer 2 is configured to change the print settings currently set to the printer 2 to the default print settings when the printer 2 receives an instruction to reset the print settings to the default settings via the operation panel (not shown in the figure) or the management device. The default print settings are the print settings which have been stored in the non-volatile memory of the printer 2, as the default settings, when the printer 2 is shipped from the factory or before delivered to the user. The default print settings will be described later.

Figure 2:
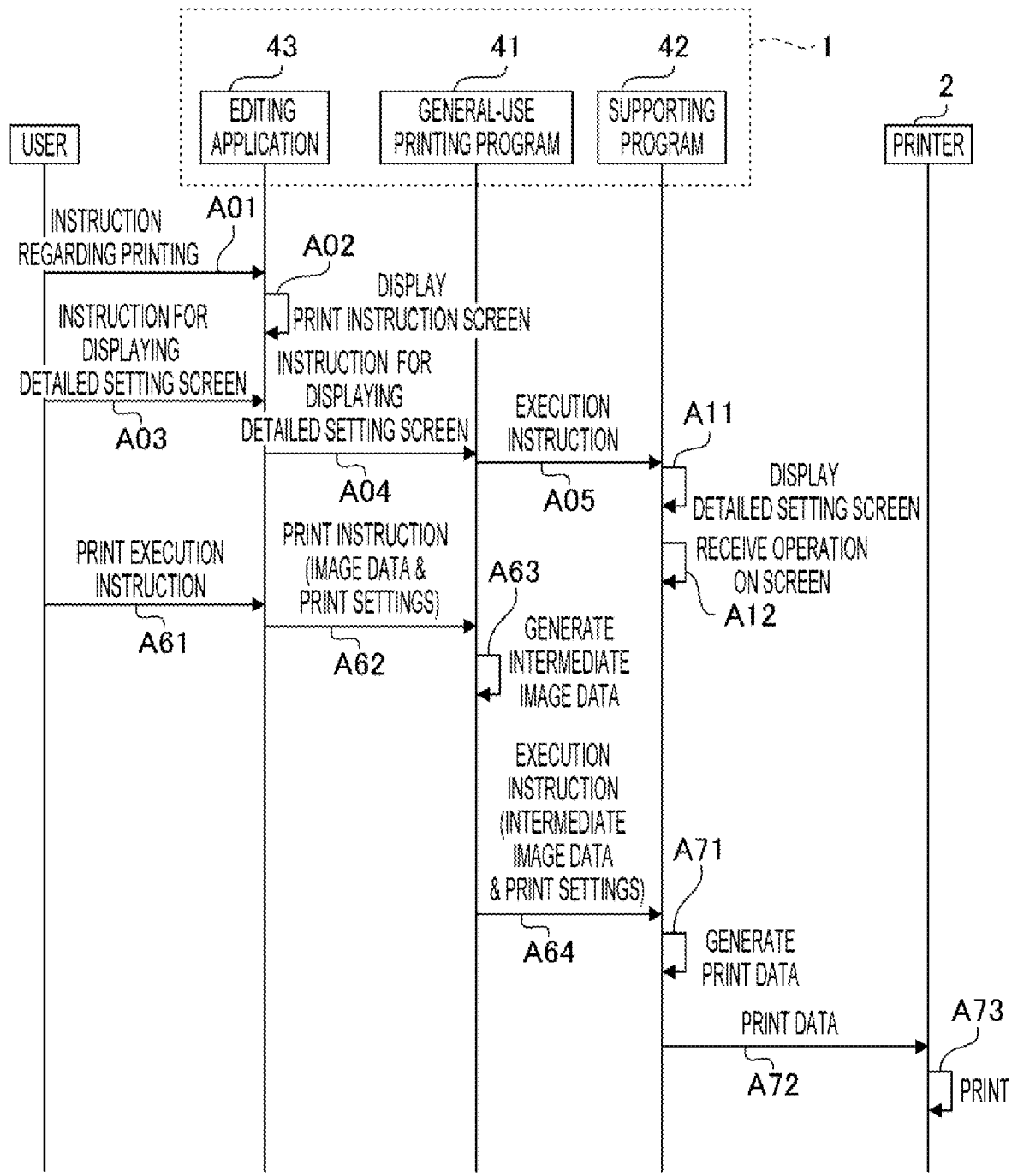
FIG. 2 is a sequence diagram illustrating an example of a printing operation performed by each program.

Next, a printing process including an operation of the supporting program 42 according to the present embodiment will be described with reference to a sequence diagram shown in FIG. 2. FIG. 2 shows a case where an application (e.g., an editing application) receives a print execution instruction to cause the printer 2 to execute printing with use of the general-use printing program 41, and when the supporting program 42 corresponding to the printer 2 is embedded in the PC 1.

It is noted that each processing step of the processes and flowcharts according to the present embodiment basically indicates a process of the CPU 11 according to the instructions written in the program such as the supporting program 42. The processes by the CPU 11 include hardware control using the API of the OS 21. In this specification, operations of each program will be described with omitting detailed descriptions of the OS 21. Further, a term "obtain" will be used in a concept that does not require a request.

The editing application 43 is configured to receive instructions to generate and/or edit texts, diagrams, and the like. When the editing application 43 receives an instruction to print a currently selected text or the like (A01), the editing application 43 displays a print screen prompting the user's instruction (A02). Then, the editing application 43 receives, through the print screen, the user's instruction to execute printing, to perform basic print settings, to start receiving detailed print settings, and the like.

When the editing application 43 receives an instruction to start receiving detailed print settings while the printer 2 is selected on the print screen which is currently displayed (A03), the editing application 43 passes the information regarding the instruction to receive the detailed print settings to OS21. The OS 21 executes the general-use printing program 41 when receiving the instruction for detailed settings regarding the printing using the general-use printing program 41, and passes an instruction to start receiving the detailed print settings to 41 (A04). It is noted that the instruction to start receiving the detailed print settings is an example of a display instruction. When the general-use printing program 41 receives the instruction to start receiving the detailed print settings, the general-use printing program 41 passes an execution instruction to start receiving the detailed print settings to the supporting program 42 corresponding to the printer 2 which is the currently selected printer (A05).

Figure 3A:
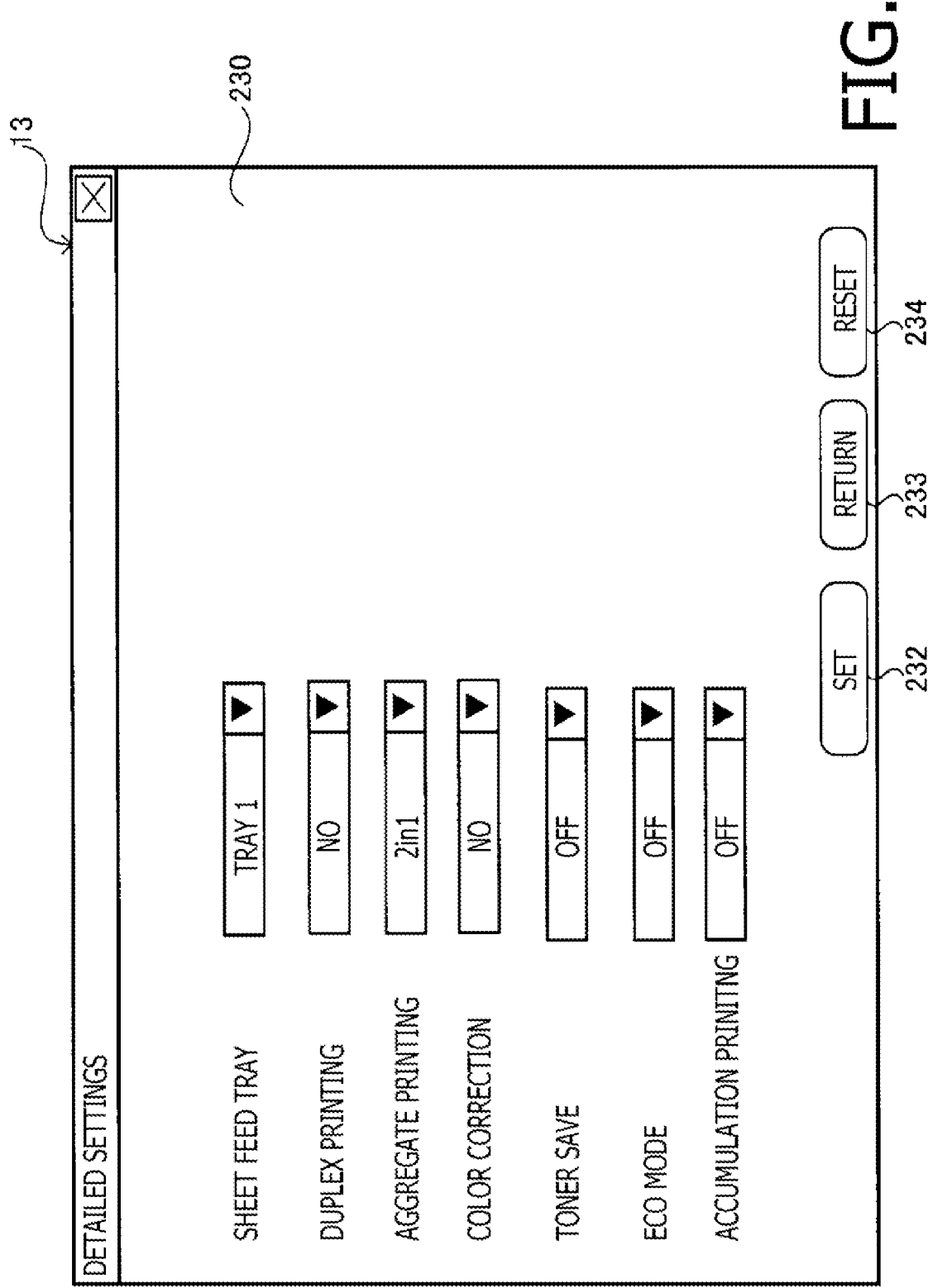
FIGS. 3A and 3B show examples of detail setting screens.
Figure 3B:
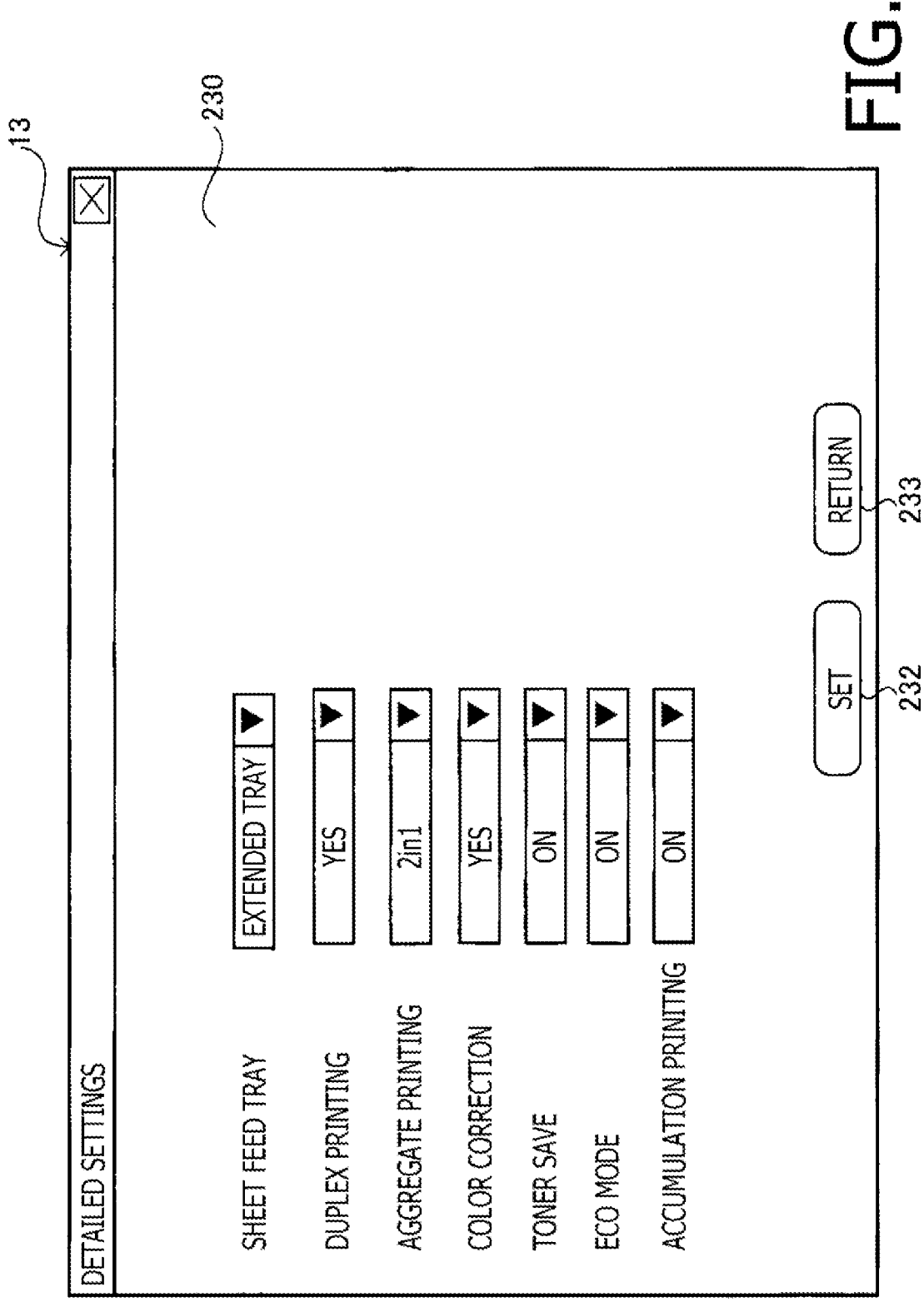

In response to the execution instruction, the supporting program 42 displays the detailed setting screen for receiving the detailed print settings to be used for printing with the printer 2 on the user IF (A11). It is noted that the detailed setting screen is an example of a setting screen, and the process of A11 is an example of a displaying process. Examples of the detailed setting screen is shown in FIGS. 3A and 3B. FIG. 3A shows a state before the default print settings are reflected, and FIG. 3B shows a state after the default print settings have been reflected.

As shown in FIG. 3A, print setting items are displayed on a detailed setting screen 230. The print setting items include print setting items which are specific to the printer 2 and are not supported by the general-use printing program 41. Therefore, on the detailed setting screen 230, the print settings, which cannot be supported by the general-use printing program 41, can be set. The print setting items displayed on the detailed setting screen 230 may optionally include print setting items which are supported by the general-use printing program 41. Each item displays the setting value a currently set in the supporting program 42 (hereinafter referred to as "PC-side current value"). Each item is configured such that a plurality of setting values are selectably displayed or can be entered arbitrarily so that the setting values can be changed. Even a setting value, which cannot be set by the general-use printing program 41, can be set to each item, as long as the setting value can be supported by the printer 2.

On the detailed setting screen 230, a setting button 232, a return button 233, and a reset button 234 are displayed. The setting button 232 is an operator for receiving an instruction to establish the print settings. The return button 233 is an operator for receiving an instruction to return to a previous screen without establishing the print settings. The reset button 234 is an operator for receiving an instruction to reflect the default print settings stored in the printer 2 for the print settings displayed on the detailed setting screen 230. It is noted that the reset button 234 is an example of a particular operator.

Returning to FIG. 2, the supporting program 42, which displays the detailed setting screen 230, performs a screen operation receiving process (A12). In the screen operation receiving process, the CPU 11 receives the operation with respect to the detailed setting screen 230 via the user IF 13.

Figure 4:
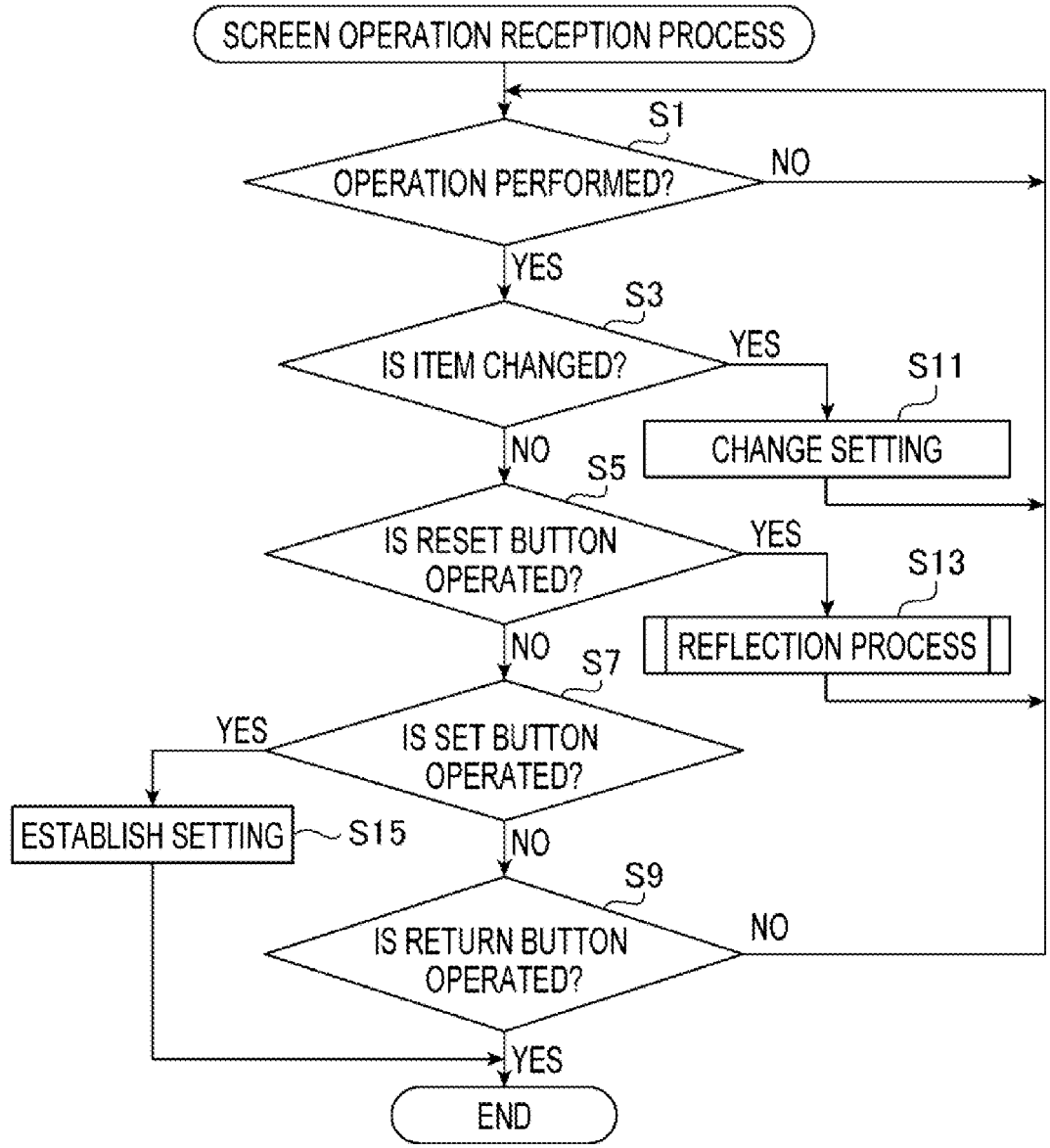
FIG. 4 is a flowchart illustrating a screen operation receiving process.

The screen operation receiving process will be described with reference to the flowchart shown in FIG. 4. The screen operation receiving process is performed by the CPU 11 of the PC 1. The CPU 11 determines whether any of the operators displayed on the detailed setting screen 230 has been operated (S1). When none of the operators displayed on the detailed setting screen 230 is operated (S1: NO), the CPU 11 pauses until any of the operators is operated.

When the CPU 11 receives an operation to change any of the items displayed on the detailed setting screen 230 (Y1: YES, S3: YES), the CPU 11 changes the setting for the item according to the input operation (S11), and returns to S1. When, for example, a setting display of the sheet feed tray on the detailed setting screen 230 is changed from "Tray 1" to "Expansion tray," the CPU 11 changes the print setting of the sheet feed tray from the "Tray 1" to the "Expansion tray."

When the reset button 234 displayed on the detailed setting screen 230 shown in FIG. 3A is operated through the user IF 13 (S1: YES, S3: NO, S5: YES), the CPU 11 performs a reflection process (S13). The reflection process is a process of setting the print settings displayed on the detailed setting screen 230 to the default print settings stored in the printer 2.

The reflection process is described with reference to a flowchart in FIG. 5. The reflection process is executed by the CPU 11 of the PC 1. The CPU 11 determines whether the default print settings of the printer 2 are stored in the non-volatile area of the memory 12 that can be used by the supporting program 42 (S21), i.e., whether the default print settings have been cached or not. When the default print settings of the printer 2 are not stored in the non-volatile area of the memory 12 usable by the supporting program 42 (S21: NO), the CPU 11 determines that they are not cached. In this case, the CPU 11 requests the printer 2 to send the default print settings with use of the communication IF 14 (S23).

The printer 2 obtains the default print settings stored in the non-volatile memory of itself in response to a request from the PC 1. The printer 2 then transmits the obtained default print settings to the PC 1 from which the request was received as a response. The CPU 11 waits until the default print settings sent from the printer 2 are received via the communication IF 14 (S25: NO).

The communication between the PC 1 (i.e., the supporting program 42) and the printer 2 may be performed such that the supporting program 42 directly communicates with the printer 2 using the MIB (abbreviation of Management Information Base) or via the OS 21. When the communication therebetween is performed via the OS 21, the supporting program 42 and the printer 2 may communicate with each other according to the communication protocol of the OS 21, such as the IPP (Internet Printing Protocol).

When the CPU 11 receives the default print settings sent from the printer 2 via the communication IF (S25: YES), the CPU 11 reflects the default print settings received from the printer 2 in the detailed print settings displayed on the detailed setting screen 230 (S27). When the detailed setting screen 230 is in a state shown in FIG. 3A, and when, for example, the setting value of the sheet feed tray in the received default print settings is "Expansion Tray," the sheet feed tray setting is changed from "Tray 1" to "Expansion Tray" as shown in FIG. 3B. It is noted that the process of S23 and S25 is an example of an "obtaining process" and a process of S27 is an example of the reflection process.

The print settings include items related to application of processing to images (hereinafter referred to as "image processing items") and items that are not related to application of processing to images (hereinafter referred to as "non-image processing items"). The image processing items include, for example, color correction, toner saving, aggregate printing such as Nin1, and composite printing such as watermark. The non-image processing items include, for example, sheet feed trays, sheet discharge trays, duplex printing, color printing, eco-mode, and accumulation printing (i.e., printing of accumulated image data).

The default print settings are the print settings stored, in advance (e.g., at a time of shipping), in the non-volatile memory of the printer 2, as described above, and cannot be changed normally by the user operation.

The default print settings are determined, in advance, for each model, but some items may be customized based on an installation status of optional equipment or particular requirement/preference of the country where the printer 2 is used.

For example, the "Tray 1" is usually set in the default print setting for the sheet feed tray. However, when the printer 2 is shipped with a special optional component such as an expansion tray, customization of the default settings is made such that the default setting of the sheet feed tray of the printer 2 is set to the "Expansion tray." In such a case, although the current PC-side value for the item of the sheet feed tray is "Tray 1" as shown in FIG. 3A, the setting of the sheet feed tray is changed to the "Expansion Tray" (see FIG. 3B) by reflecting the default print settings stored in the memory of the printer 2.

Regarding the duplex printing, the default print setting therefor is usually "No." However, in the United States and Europe, environmentally friendly printing might be required. Therefore, when the shipping destination of the printer 2 is in the U.S. or Europe, the default print setting of the printer 2 may be customized such that the default setting for duplex printing is set to "Yes." In such a case, although the current PC-side value for the item of the duplex printing is "No" as shown in FIG. 3A, the setting of the duplex print setting is changed to the "Yes" (see FIG. 3B) as the default print settings stored in the memory of the printer 2 are reflected.

Regarding the eco-mode, the default print setting is usually "Off." However, when the shipping destination of the printer 2 is the United States or Europe, where environmentally friendly printing might be required, the printer 2 may be customized with the default setting of "On" for the eco-mode. The eco-mode is a mode in which the conveying speed of the sheet during printing is slowed, thereby reducing the noise generated during printing. In this case, as shown in FIG. 3A, although the PC-side current value for the eco-mode is "Off," as the default print settings are reflected, the setting in the eco-mode is changed to "On" as shown in FIG. 3B.

Regarding the color correction, the default print setting is usually "No." However, in China and Arabia, there is a demand for customizing the red color as a desired color. Therefore, when the destination of the printer 2 is China or Arabia, the printer 2 may be customized to have a default setting of "Yes" for the color correction. The supporting program 42 has a conversion table for converting RGB values to CMYK values. Further, the supporting program 42 is configured to receive settings for preferred hue (brightness, RGB values, and the like) for particular colors. The color correction is a setting to correct the conversion table for a particular color (e.g., red) based on the preferred hue. The particular color is not necessarily limited to red, but can also be blue or green. As shown in FIG. 3A, although the PC-side current value for the color correction is "Off," as the default print settings are reflected, the setting in the color correction is changed to "On" as shown in FIG. 3B.

As described above, even though the user is not aware of the default print settings customized according to the installation status of optional parts or the shipping destination, the customized default print settings can be displayed collectively on the detailed setting screen 230. Therefore, when the user needs to use the customized default print settings, the time and effort necessary for the user to make print settings individually in order to match the default print settings is reduced.

When the printer 2 supports the accumulation printing, the default print settings include settings for the accumulation printing. The accumulation printing is a printing method in which print data received from an external device such as PC 1 is accumulated in the memory of the device instead of being printed immediately, and the accumulated print data is printed when a print instruction is received via the operation panel. The accumulation printing may be a secure printing method in which the user is required to input user information such as a user ID and a password, and the print execution instruction is received and printing is executed when the user authentication is successful. As shown in FIG. 3A, when the PC-side current value of the accumulation printing is "Off" while the default print setting of the accumulation printing is "On," as shown in FIG. 3B, the default print setting of the accumulation printing is changed from "Off" to "On." This allows the user to check the setting for the accumulation print settings of the printer 2 even from a PC 1 located remote from the printer 2.

Figure 5:
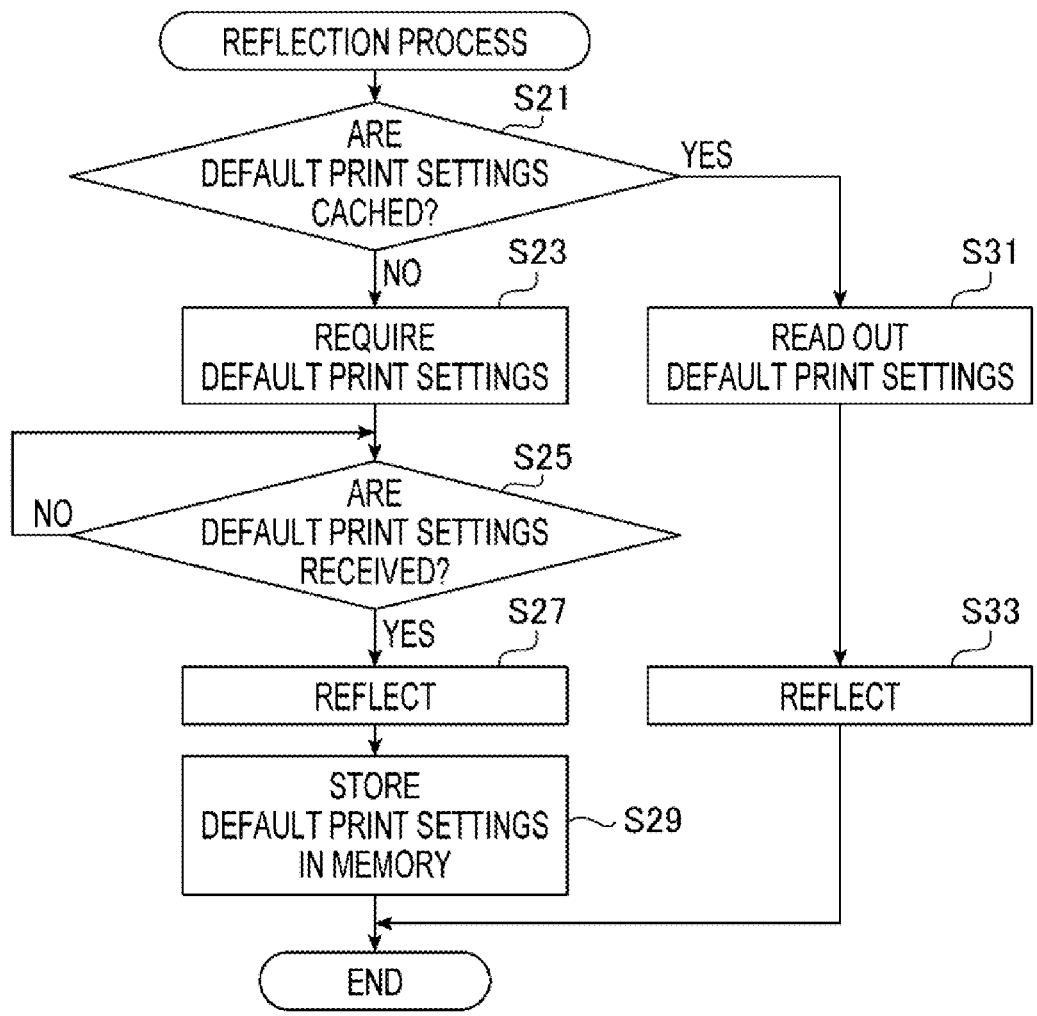
FIG. 5 is a flowchart illustrating a reflection determination process.

As shown in FIG. 5, after reflecting the default print settings, the CPU 11 stores the default print settings received from the printer 2 at S25 in a non-volatile area in the memory 12 which the supporting program 42 can use (S29)

and terminates the reflection process. It is noted that the process in S29 is an example of a cache process. It is noted that the processes of S27 and S29 may be performed in reverse order or simultaneously.

When the default print settings of the printer 2 are stored in the non-volatile area in the memory 12 that can be used by the supporting program 42, the CPU 11 determines that the default print settings are cached (S21: YES). In this case, the CPU 11 read out the default print settings from the non-volatile area in the memory 12 which the supporting program 42 can use (S31). In this way, the supporting program 42 obtains the default print settings. It is noted that the process in S31 is an example of an obtaining process.

Then, the CPU 11 reflects the default print settings read out from the memory 12 to respective items of the print settings displayed on the detailed setting screen (S33), and terminates the reflection process. Since the process of S33 is the same as the process of S27, the description thereof is omitted. It is noted that the process of S33 is an example of the reflection process.

Returning to FIG. 4, after completing the reflection process, the CPU 11 returns to S1. When the setting button 232 displayed on the detailed setting screen 230 (see FIG. 3A and FIG. 3B) is operated via the user IF (S1: YES; S3: NO; S5: NO; S7: YES), the CPU 11 establishes the print settings displayed on the detailed setting screen 230 (S15), and terminates the screen operation receiving process. The established print settings are stored, for example, in the non-volatile area of the memory 12 which the supporting program 42 can use. Accordingly, the values of the established print settings can be displayed as the PC-side current values when the next detailed print settings are made. The established print settings may be stored in a volatile area of the memory 12.

When the return button 233 displayed on the detailed setting screen 230 of FIG. 3A and FIG. 3B is operated via the user IF 13 (S1: YES; S3: NO; S5: NO; S9: YES), the CPU 11 terminates the screen operation receiving process. When operations other than changing operations for the items or operations of the buttons 232-234 are made (S1: YES; S3: NO; S5: NO; S9: NO), the CPU 11 performs other processes (S17) and terminates the screen operation receiving process.

When terminating the screen operation receiving process, the supporting program 42 closes the detailed setting screen 230 and passes an end notification to the general-use printing program 41. At this time, the supporting program 42 passes the print settings received via the detailed setting screen 230 to the general-use printing program 41. The general-use printing program 41 passes the end notification and the print settings received from the supporting program 42 to the editing application 43.

When receiving a print execution instruction from the user via the print screen (A61), the editing application 43 passes the print instruction to the general-use printing program 41 (A62). The general-use printing program 41 obtains, in response to the print instruction, information indicating image data to be printed and information indicating the print settings. The print settings include the print settings received via the detailed setting screen 230.

The general-use printing program 41 generates the intermediate image data by converting the format of the image data contained in the received print instruction into the format of the intermediate image data (A63). The image data contained in the editing application 43 can be of various types, and the general-use printing program 41 converts the received image data into the intermediate image data suitable for generating the print data. When the image data included in the print instruction is suitable for generating the print data, the generation of the intermediate image data may be skipped and the image data is used as the intermediate image data as is. The intermediate image data is, for example, XPS data.

The general-use printing program 41 further outputs an execution instruction to the supporting program 42 (A64) to operate the supporting program 42. In the execution instruction, the generated intermediate image data and the information regarding the print settings are passed to the supporting program 42. The print settings include the print settings received via the detailed setting screen 230.

The supporting program 42 generates the print data based on the execution instructions received from the general-use printing program 41 (A71). The print data is generated by performing rasterizing based on the intermediate image data. The print data is data in a format that can be used by the printer 2 for printing, and is, for example, PDL data dedicated to the model of the printer 2. It is noted that the print data is an example of a raster image. When the supporting program 42 generates the print data from the intermediate image data, the supporting program 42 processes the print image according to the settings of the items corresponding to the processes applied to the image. It is noted that the process of A71 is an example of an image processing.

When, for example, the aggregate printing is set to 2-in-1, the supporting program 42 processes the intermediate image data so that two images are aggregated into one image. For another example, when the composite printing is set to "Yes" and the image of "CONFIDENTIAL" is selected as the composite image, the supporting program 42 processes the intermediate image data to synthesize data representing the image of "CONFIDENTIAL" with the intermediate image data. Then, the supporting program 42 rasterizes the processed intermediate image data to generate the print data.

When the color correction is set to "Yes," the supporting program 42 corrects the conversion table for a particular color (for example, a particular red color). Then, when rasterizing the intermediate image data to generate print data, the supporting program 42 converts the RGB values of the particular color designated in the print instruction to CMYK values based on the corrected conversion table. The supporting program 42 then converts the RGB values of the specific color specified in the printed image to CMYK values based on the corrected conversion table.

When the color correction is set to "Yes" and the supporting program 42 receives the settings for hues such as brightness and RGB values, the supporting program 42 corrects RGB values in accordance with the settings of the hue when generating the print data by rasterizing the intermediate data. When the toner saving is set to "On," the supporting program 42 reduces the density of the image to be printed when generating the print data by rasterizing the intermediate image data.

When the print settings include settings for the non-image processing items, i.e., the settings for the sheet tray, the sheet discharge tray, the duplex printing, the color printing, the eco mode, and the accumulation printing, the supporting program 42 generates print data to which commands to cause the printer to perform printing operations based on the above settings for the non-image processing items.

As described above, by perform rasterization with use of the supporting program 42 corresponding to the printer 2, it becomes possible to generate the print data more suitable for printing with the printer 2 with a greater degree of freedom in comparison with a case where the rasterization is performed with the general-use printing program 41. It is noted that the print data generated by the supporting program 42 may be in a format that can be used for printing by a printer other than the model of the printer 2.

Instead of the supporting program 42 generating the print data, the general-use printing program 41 may generate the print data. That is, when the supporting program 42 determines that printing is to be executed, the supporting program 42 may pass the information of print execution to the general-use printing program 41. In that case, the general-use printing program 41 rasterizes the intermediate image data which is generated in A63 to generate the print data. Then, the general-use printing program 41 passes the generated print data to the supporting program 42.

The print data generated by the general-use printing program 41 is print data in a format that can be used for printing by various printers (e.g., PWGRaster data, or PDL data). When the rasterization is performed by the general-use printing program 41, the processing load to the supporting program 42 is reduced, and an increase in processing time can be lessened in comparison with a case where the supporting program 42 performs the rasterization. Further, a program size of the supporting program 42 can be reduced.

The supporting program 42 transmits the print data generated in A71 to the printer 2 together with the print command that instructs the execution of printing (A72). When receiving the print data from the general-use printing program 41, the supporting program 42 transmits the print data received from the general-use printing program to the printer 2 together with a print command that instructs the execution of printing. When receiving the print data and the print command, the printer 2 executes printing of the image represented by the print data based on the received print command (A73). In this way, a printed matter is generated. The supporting program 42 notifies the general-use printing program 41 that the transmission of the print data has been completed.

The transmission of print data and the like to the printer 2 may be performed by the general-use printing program 41. That is, the supporting program 42 may pass the generated print data to the general-use printing program 41 so that the supporting program 42 is transmitted from the PC 1 with the printer 2 as the destination. In other words, the supporting program 42 may pass the generated print data to the general-use printing program 41 so that it is sent from the PC 1 with the printer 2 as the destination. The general-use printing program 41 sends the print data received from the supporting program 42 to the printer 2.

As described in detail above, the supporting program 42 according to the present embodiment is configured to obtain the default print settings stored, in advance, in the printer 2, and reflect the same in the detailed setting screen 230 displayed on the PC 1. That is, the print settings displayed on the detailed setting screen 230 are set as the default print settings of the printer 2, and print instructions with the default print settings become receivable. With this configuration, user's time and effort for making the print settings when the user wishes to perform printing with the default print settings of the printer 2 can be reduced.

In addition, the supporting program 42 according to the present embodiment reflects the default print settings of the printer 2 in response to reception of the user operation of the reset button 234 displayed on the detailed setting screen 230. In this way, when the user wishes to use the default print settings on the printer 2 itself, the user can change the print settings displayed on the detailed setting screen 230 to the default print settings by operating the reset button 234. Thus, when the user wishes to use the default print settings on the printer 2 itself, the user's time and effort to use such print settings can be reduced.

Second Embodiment

Next, a printing system according to a second embodiment will be described. The printing system is configured in the same manner as the printing system according to the first embodiment, except for a timing at which the default print settings are reflected on the detailed setting screen. Therefore, in the following description, portions that differ from the first embodiment is mainly described, while portions same as in the first embodiment are assigned with the same reference numerals and the description thereof will be omitted as appropriate.

Figure 6:
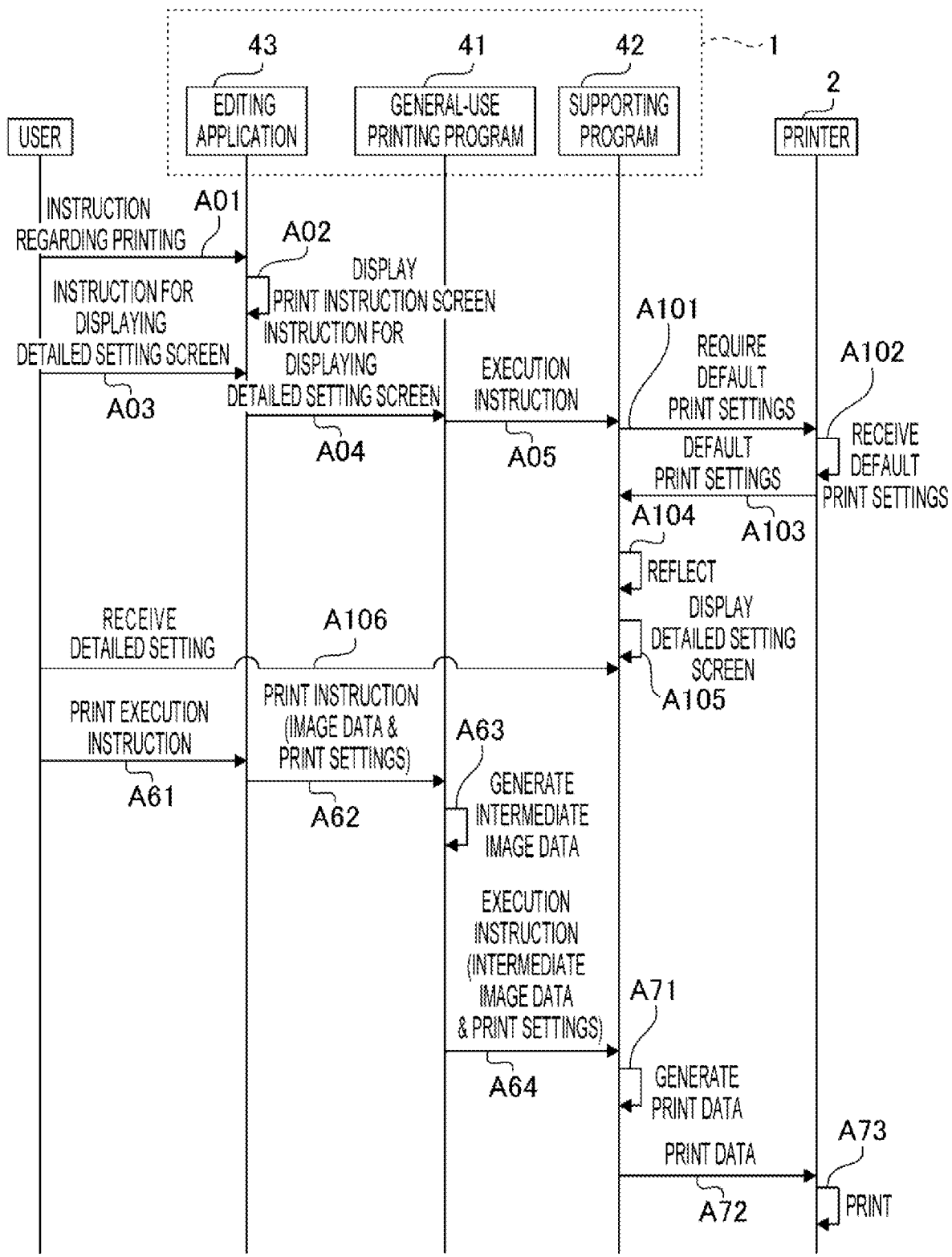
FIG. 6 is a sequence diagram illustrating another example of the printing operation performed by each program.

As shown in a sequence diagram shown in FIG. 6, when the supporting program 42 receives the execution instructions that the general-use printing program 41 outputs in response to a reception start instruction received from the editing application 43 (A05), the supporting program 42 requests the printer 2 via the communication IF 14 to transmit the default print settings (A101). The printer 2, in response to the request, obtains the default print settings by reading out the same from the non-volatile memory (A102), and responds to the PC 1 (i.e., transmits the same to the PC 1). When receiving the default print settings transmitted by the printer 2 via the communication IF 14 (A103), the supporting program 42 reflects the obtained default print settings to the PC-side current values which are set to the PC 1 (A104). Thereafter, the supporting program 42 displays the detailed setting screen 230 (see FIG. 3B) reflecting the default print settings on the user IF 13 (A105) and receives the detailed print settings (A106).

As above, the supporting program 42 according to the present embodiment displays the detailed setting screen 230 (see FIG. 3B), which reflects the default print settings from the beginning, on the user IF 13. According to the above configuration, initial settings of the print settings on the PC 1 side can be used as the default print settings for the printer 2. Therefore, when the user wishes to instruct printing with the default print settings, there is no need to change the print settings, and the user's time and effort to make the print setting is reduced.

The embodiments disclosed herein are merely examples and do not limit the invention in any way. Therefore, the technology disclosed herein can naturally be improved and/or modified in various ways within aspects of the present disclosure, but not deviating therefrom. For example, the device connected to the PC 1 is not necessarily limited to a printer, but can be a multifunctional peripheral, a copier, a facsimile machine, or any other device having a printing function. The number of printers connected to the PC1 is not necessarily limited to the example shown in the drawings, but can be two or more.

The detailed setting screens 230 shown in FIGS. 3A and 3B are merely examples and aspects of the present disclosures are not necessarily limited to such configurations. For example, the items of the print settings displayed on the detailed setting screen 230 are not limited to those shown in the drawings. Optionally, the items displayed on the detailed setting screen 230 may be different before and after reflecting the default print settings. For example, only the print settings that can be set by the user may be displayed on the detailed setting screen before reflecting the default print settings, while the detailed setting screen after reflecting the default print settings may display all the print settings that can be set for the printer 2, including the print settings that cannot be set by the user.

For example, the processes in S21, S29, S31, and S33 in FIG. 5 may be omitted. It is noted, however, if the processes of S21, S29, S31, and 33 are present, the supporting program 42 stores the default print settings obtained from the printer 2 in the memory. Therefore, the number of communications between the supporting program 42 and the printer 2 can be reduced, and the default print settings can be promptly reflected in the detailed setting screen 23.

The image processing process to process the image according to the print settings may not be performed by the supporting program 42, but by the general-use printing program 41 or the printer 2. In such a case, the supporting program 42 does not need to obtain the default settings of the image processing items from the printer 2. However, by obtaining, from the printer 2, the default print settings for at least the items for which the supporting program 42 processes images among the setting items of the print settings, the image processing corresponding to the default print settings of the printer 2 itself can be performed on the PC 1 side, which can reduce the cost of the printer 2.

In the above embodiments, only the printing operation is described in detail as the operation of the supporting program 42. However, the supporting program 42 may have other functions in addition. It is noted that the program that executes the processing according to the present embodiment is not necessarily limited to the supporting program 42, but can be any program which is configured to receive instructions from the OS 21 or the general-use printing program 41 when the printing using the general-use printing program 41 is to be performed. For example, such a program can be the Print workflow application published by Microsoft Corporation.

An execution timing of the supporting program 42 is not necessarily limited to the examples in the embodiments. For example, the supporting program 42 may be executed with a direct execution instruction from the OS 21. Alternatively, the supporting program 42 may be configured as a resident program, and to perform the aforementioned operation upon receiving an execution instruction.

In any of flowcharts disclosed in the embodiments, multiple processes in any of steps can be executed in any order, or can be executed in parallel, as long as there is no inconsistency in the processing content.

Each of the processes disclosed in the embodiments may be performed by a single CPU, multiple CPUs, an ASIC, or a combination thereof. In addition, the processes disclosed in the embodiments may be realized in various ways, such as a non-transitory computer-readable recording medium in which a program(s) for executing the processes are stored, or a method.

Third Embodiment

Figure 7:
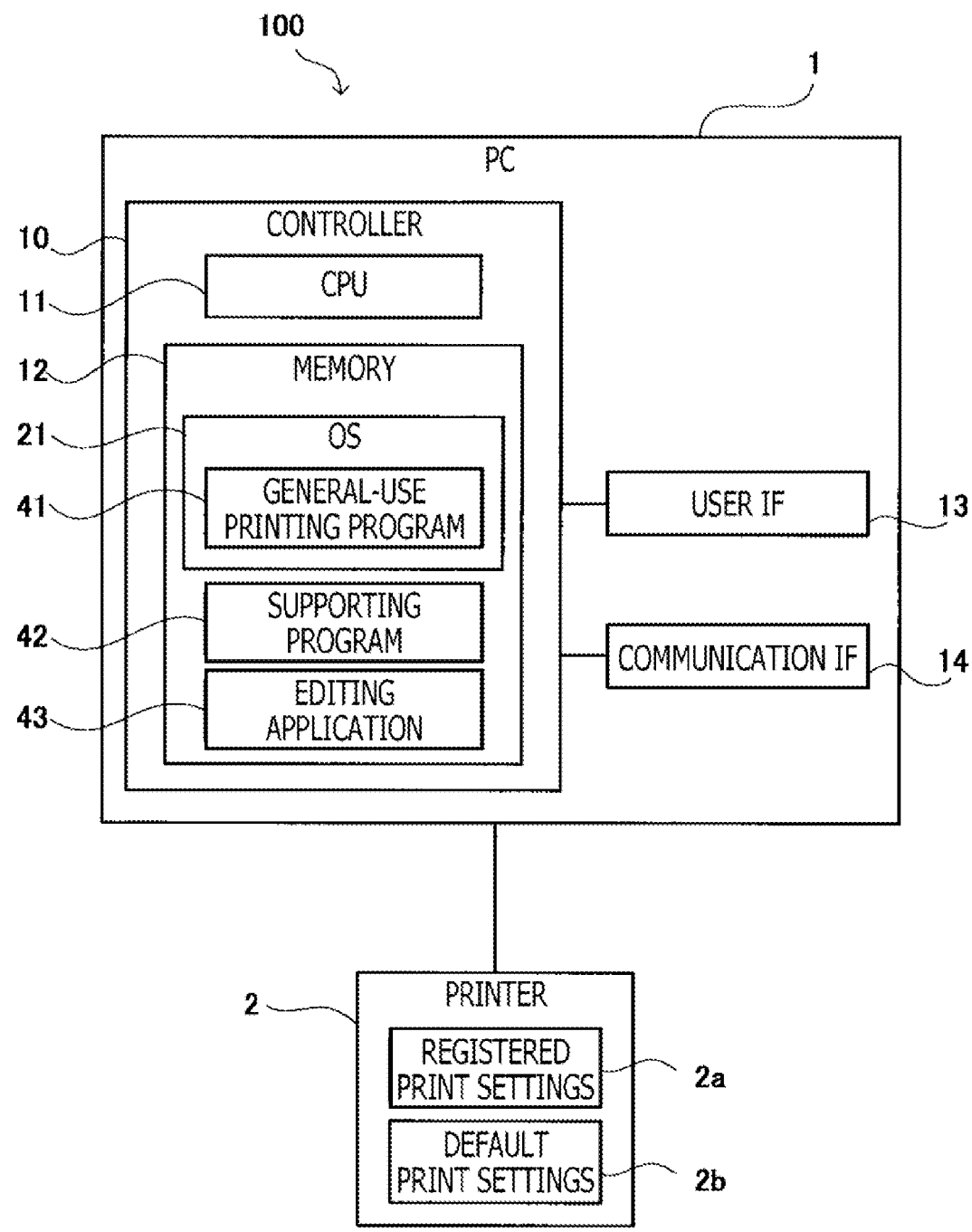
FIG. 7 is a block diagram showing an electrical configuration of a PC.

Next, a printing system according to a third embodiment will be described. The printing system is configured in the same manner as the printing system according to the first embodiment, except that a printer 2 includes registered print settings 2*a* and default print settings 2*b* as shown in FIG. 7. Therefore, in the following description, portions that differ from the first embodiment is mainly described, while portions same as in the first embodiment are assigned with the same reference numerals and the description thereof will be omitted as appropriate. Further, a printing process including the operation of the supporting program 42 according to the present embodiment is performed in accordance with the sequence diagram shown in FIG. 2.

The printer 2 is configured to receive the registration of particular print settings via the operation panel of the printer 2 itself or a management device configured to manage the printer 2, and stores the thus registered print settings (hereinafter referred to as "registered print settings") 2*a* in a non-volatile memory of the printer 2. The registration or modification of the registered print settings 2*a* may be performed by an external device using an EWS (EWS: Embedded Web Server) which is embedded in the printer 2. The registered print settings 2*a* are not default print settings 2*b* that are stored in advance at a time of shipment from the factory or before delivery to the user, but the print setting registered/modified by the user after the shipment from the factory.

When the printer 2 displays a print setting screen on the operation panel, the printer 2 displays values of respective items according to the registered print settings 2*a*. Therefore, when frequently used print settings are registered in the printer 2 as the registered print settings 2*a*, the frequently used print settings are displayed from the beginning, saving the user the trouble operation of changing the current print settings to the frequently used print settings.

It is noted that, when printing is to be performed by designating a printer, the PC 1 itself receives print settings. Therefore, in such a case, the PC 1 generates a print job with the print settings different from the registered print settings 2*a* for the printer 2 and send the thus generated print settings to the designated printer to have the designated printer perform printing.

Figure 8:
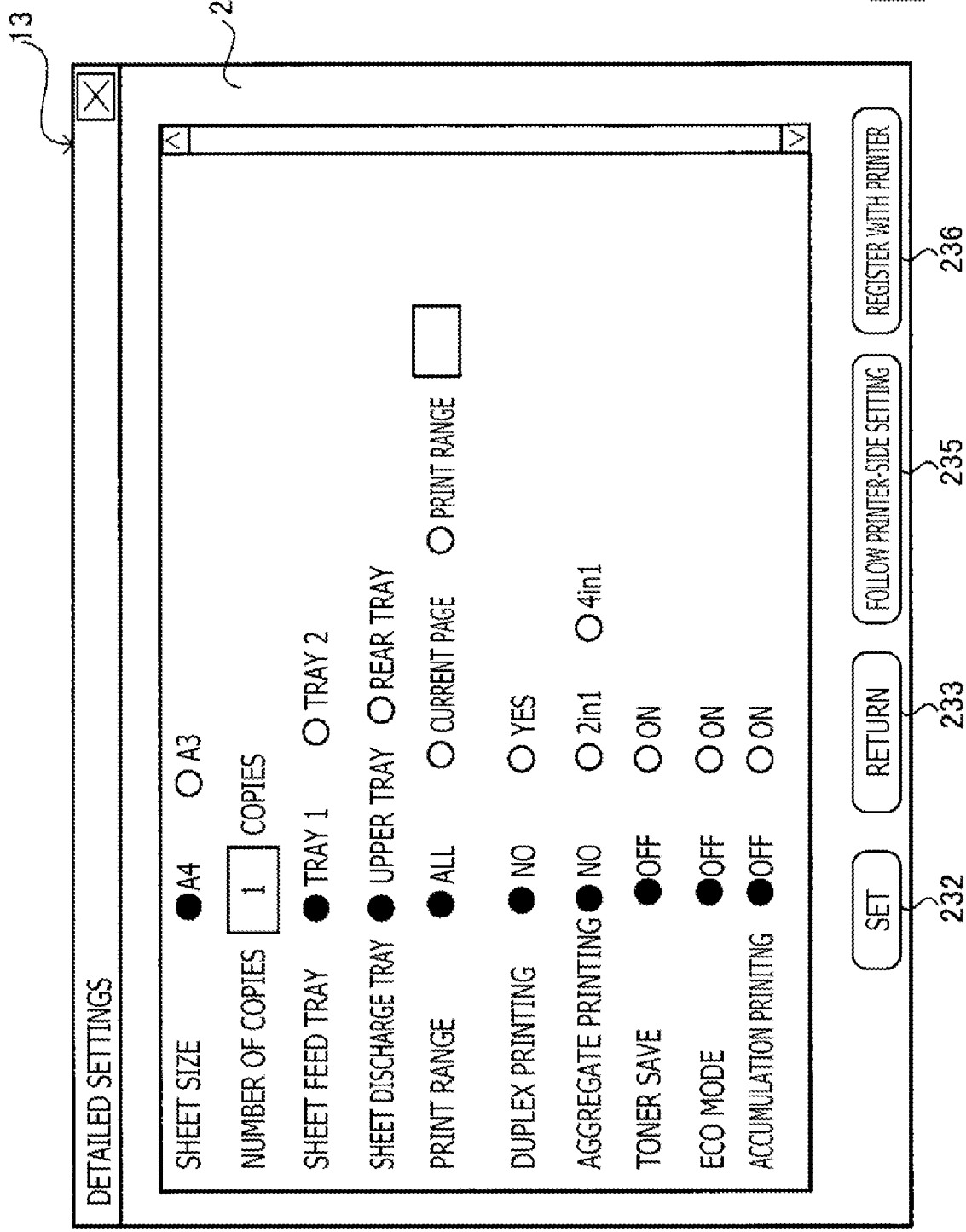
FIG. 8 shows an example of a detail setting screen.

In response to the execution instruction, the supporting program 42 displays the detailed setting screen for accepting the detailed print settings to be used for printing with the printer 2 on the user IF (A11). It is noted that the detailed setting screen is an example of a setting screen, and the process of A11 is an example of a displaying process. An example of the detailed setting screen is shown in FIG. 8.

The print setting items are displayed on a detailed setting screen 230. The print setting items include print setting items which are specific to the printer 2 and are not supported by the general-use printing program 41. Therefore, on the detailed setting screen 230, the print settings that cannot be supported by the general-use printing program 41 can be set. The print setting items displayed on the detailed setting screen 230 may optionally include print setting items which are supported by the general-use printing program 41.

To each item, a radio button for selecting the setting that the printer 2 can support is provided. For example, the print setting of the sheet size, a radio button to select a size of "A4" or "A3," which is a standard size, is provided. Each item can be set to a setting value that cannot be set by the general-use printing program 41, as long as the setting value can be supported by the printer 2.

The detailed setting screen 230 has a setting button 232, a return button 233, a printer-side-setting follower button 235, and the register-with-printer button 236. The setting button 232 is an operator for receiving instructions to establish the print settings. The return button 233 is an operator to receive instructions to return to the previous screen without establishing the print settings. The printer-side-setting follower button 235 is an operator to receive instructions to follow the print settings stored in the printer 2. The printer-side-setting follower button 235 is an example of a "choice." The register-with-printer button 236 is an operator to receive the registration instruction to the register the print settings set in the detailed setting screen 230 to the printer 2. The register-with-printer button 236 is an operator to receive the registration instruction to register the print settings set in the detailed setting screen 230 to the printer 2.

Returning to FIG. 2, the supporting program 42, which displays the detailed setting screen 230, performs a screen operation receiving process (A12). In the screen operation receiving process, the CPU 11 receives the operation with respect to the detailed setting screen 230 via the user IF 13.

Figure 9:
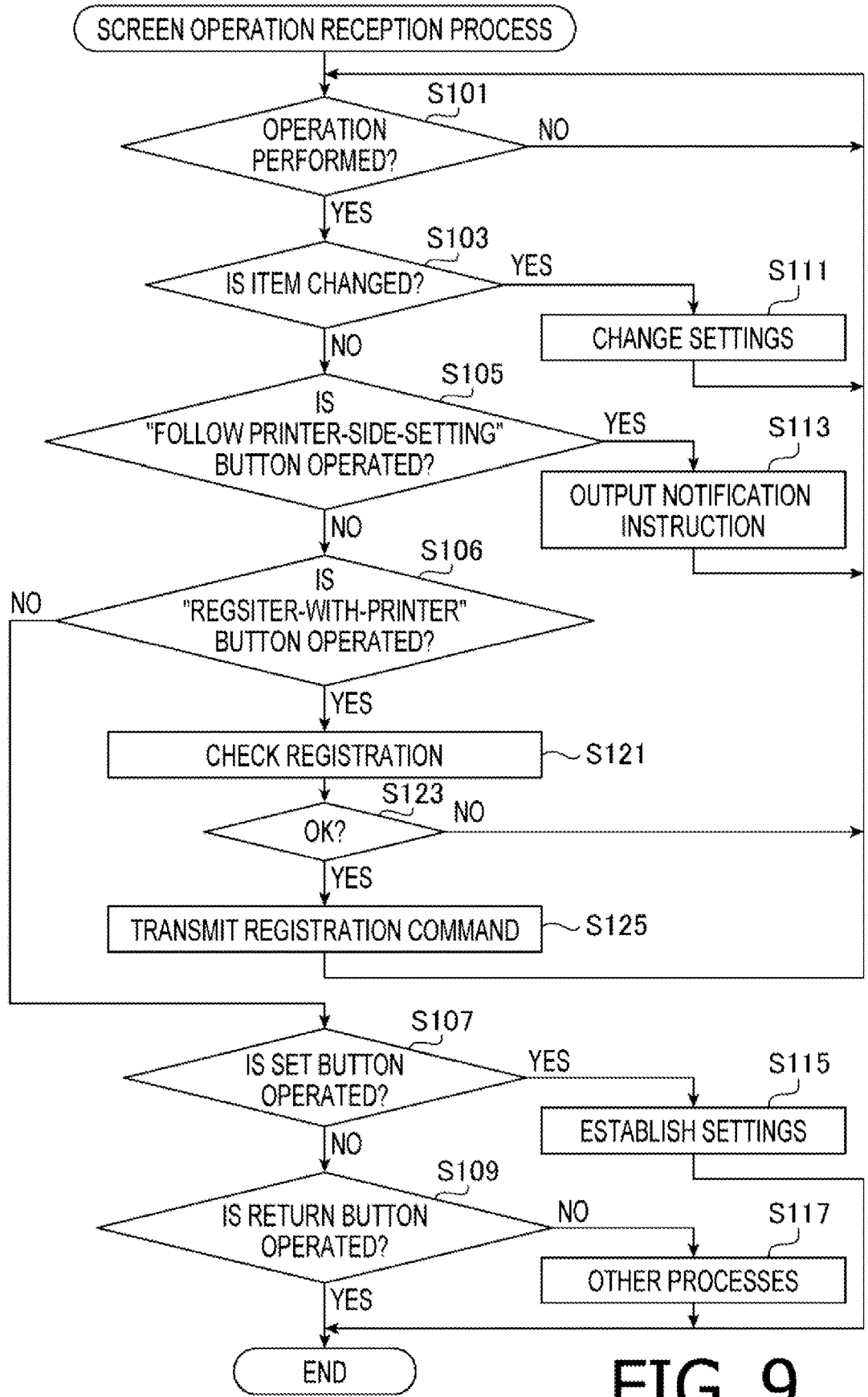
FIG. 9 is a flowchart illustrating a screen operation reception process.

The screen operation receiving process will be described with reference to the flowchart shown in FIG. 9. The screen operation receiving process is performed by the CPU 11 of the PC 1. The CPU 11 determines whether any of the operators displayed on the detailed setting screen 230 has been operated (S101). When none of the operators displayed on the detailed setting screen 230 is operated (S101: NO), the CPU 11 pauses until any of the operators is operated.

When the CPU 11 receives an operation to change any of the items displayed on the detailed setting screen 230 shown in FIG. 8 (S103: YES), the CPU 11 changes the setting for that item according to the input operation (S111) and returns to S101. For example, the CPU 11 changes the display of the print setting for the sheet size from "A4" to "A3" in accordance with the operation of the use IF 13.

When the printer-side-setting follower button 235 displayed on the detailed setting screen 230 shown in FIG. 8 is operated via the user IF 13, the CPU 11 determines that the printing is performed in accordance with the print settings stored in the printer (S101: YES; S103: NO; S105: YES). In this case, the CPU 11 outputs a notification instruction that instructs the execution of the notification process (S101: YES, S103: NO, S105: YES). In this case, the CPU 11 outputs a notification instruction instructing the execution of the notification process (S113) and returns to the process of S101. In the notification process, the CPU 11 displays a notification screen displaying registered print settings obtained from the printer 2 on the user IF 13 separately from the detailed setting screen 230, and receives the operation on the notification screen. The notification process will be described later.

When the register-with-printer button 236 displayed on the detailed setting screen 230 is operated via the user IF 13 (S101: YES; S103: NO; S105: NO; S106: YES), the CPU 11 receives a registration instruction instructing to register the setting contents displayed on the detailed setting screen 230 with the printer 2, and ask the user whether the printer 2 is to be registered (S121). In order to ask the user, the CPU 11 displays, for example, a dialogue asking the user whether the registration is necessary on the user IF 13. On the dialogue, for example, an OK button for allowing the registration, and a CANCEL button for not allowing the registration are provided (i.e., displayed).

When the CPU 11 receives the user operation of the OK button of the dialogue via the user IF 13 (S123: YES), the CPU 11 transmits a registration command to the printer 2 via the communication IF14 (S125), and returns to the process of S101. The registration command is a command to instruct the printer 2 to register the print settings set in the detailed setting screen 230, and includes the print setting information related to the print settings displayed in the detailed setting screen 230. It is noted that the CPU 11 may be configured to request an input of a password to authenticate whether the user has the authority to change the registered print settings before transmitting the registration command to the printer 2, and transmits the registration command to the printer 2 only when the authentication is successful.

When the printer 2 receives the registration command transmitted from the PC 1, the printer 2 updates the registered print settings stored in the non-volatile memory in the printer 2 with print setting information contained in the registration command. This makes it possible to cause the PC 1 to store the registered print settings in the printer 2, and eliminates the need for the user to go to the printer 2 to register or change the registered print settings via the operation panel.

It is noted that when the CPU 11 receives, for example, the operation of the cancel button via the user IF 13, the CPU 11 determines that the registration instruction is not to be received (S123: NO). In this case, the CPU 11 returns to the process of S101 without transmitting the registration command to printer 2 vial the communication IF 14.

When the setting button 232 is operated via the user IF 13 (S101: YES; S103: NO; S105: NO; S106: NO; S107: YES), the CPU 11 establishes the print settings set to the detailed setting screen 230 (S115). In other words, the CPU 11 updates the existing print settings stored in the non-volatile area of the memory 12 which can be used by the supporting program 42 with the print settings set in the detailed setting screen 230. After establishing the print settings, the CPU 11 terminates the screen operation reception process.

In contrast, when the return button 233 is operated via the user IF 13 (S101: YES; S103: NO; S105: NO; S106: NO; S107: NO; S109: YES), the CPU 11 does not change the existing print settings stored in the non-volatile are of the memory that the supporting program 42 can use, and terminates the screen operation reception process. It is noted that, when there is an operation different from the operation to change the print settings or the operation of the buttons 232 to 236 (S101: YES; S103: NO; S105: NO; S106: NO; S107: NO; S109: NO), the CPU 11 performs another processing (S117), and terminates the screen operation reception process.

Returning to FIG. 2, when the supporting program 42 terminates the screen operation receiving process, the supporting program 42 closes the detailed setting screen and passes the termination notification to the general-use printing program 41. At this time, the supporting program 42 passes the print settings received via the detailed setting screen 230 to the general-use printing program 41. The general-use printing program 41 passes the termination notification and the print settings received from the supporting program 42 to the editing application 43.

The notification process will be described with reference to a flowchart shown in FIG. 10. The notification process is to be performed by the supporting program 42, and is executed by the CPU 11 of the PC 1 when the notification instruction is output in S113 of FIG. 9. The notification process is an example of a displaying process.

The CPU 11 requests the printer 2 to transmit the registered print settings using the communication IF 14 (S131). The printer 2 obtains the registered print settings stored in the non-volatile memory of the printer 2 itself in response to the request from the PC 1. The printer 2 then transmits the obtained registered print settings to the PC 1 that transmitted the request. The CPU 11 pauses until the registered print settings transmitted from the printer 2 are received via the communication IF 14 (S133: NO).

When the CPU 11 receives the registered print settings transmitted from the printer 2 via the communication IF 14 (S133: YES), the CPU 11 displays a notification screen 300 based on all the items on the user IF 13 (S135). That is, as shown in FIG. 11, the CPU 11 displays the notification screen 300 showing all the registered print settings received from the printer 2 in S133 on the user IF 13. After that, the CPU 11 proceeds to a process of S137 shown in FIG. 10. It is noted that the registered print settings may be displayed on the same screen as the detailed setting screen 230. Alternatively, the notification screen 300 may be popped up as a process separate from the detailed setting screen 230.

As above, when the printer-side-setting follower button 235 is operated on the detailed setting screen 230, that is, when a choice instructing to follow the settings stored in the printer 2 is selected, the PC 1 obtains the registered print settings from the printer 2 with keeping the detailed setting screen 230 being displayed. Therefore, the user can grasp the contents of the registered print settings when necessary, thereby reducing a possibility of printing unintended by the user.

As shown in FIG. 11, the notification screen 300 further includes an end button 321 and an apply button 323. The end button 321 is an operator for receiving an instruction to terminate a notification of the registered print settings. The apply button 323 is an operator for receiving instructions to apply the print settings received via the notification screen 300 to the print settings displayed on the detailed setting screen 230.

Figure 10:
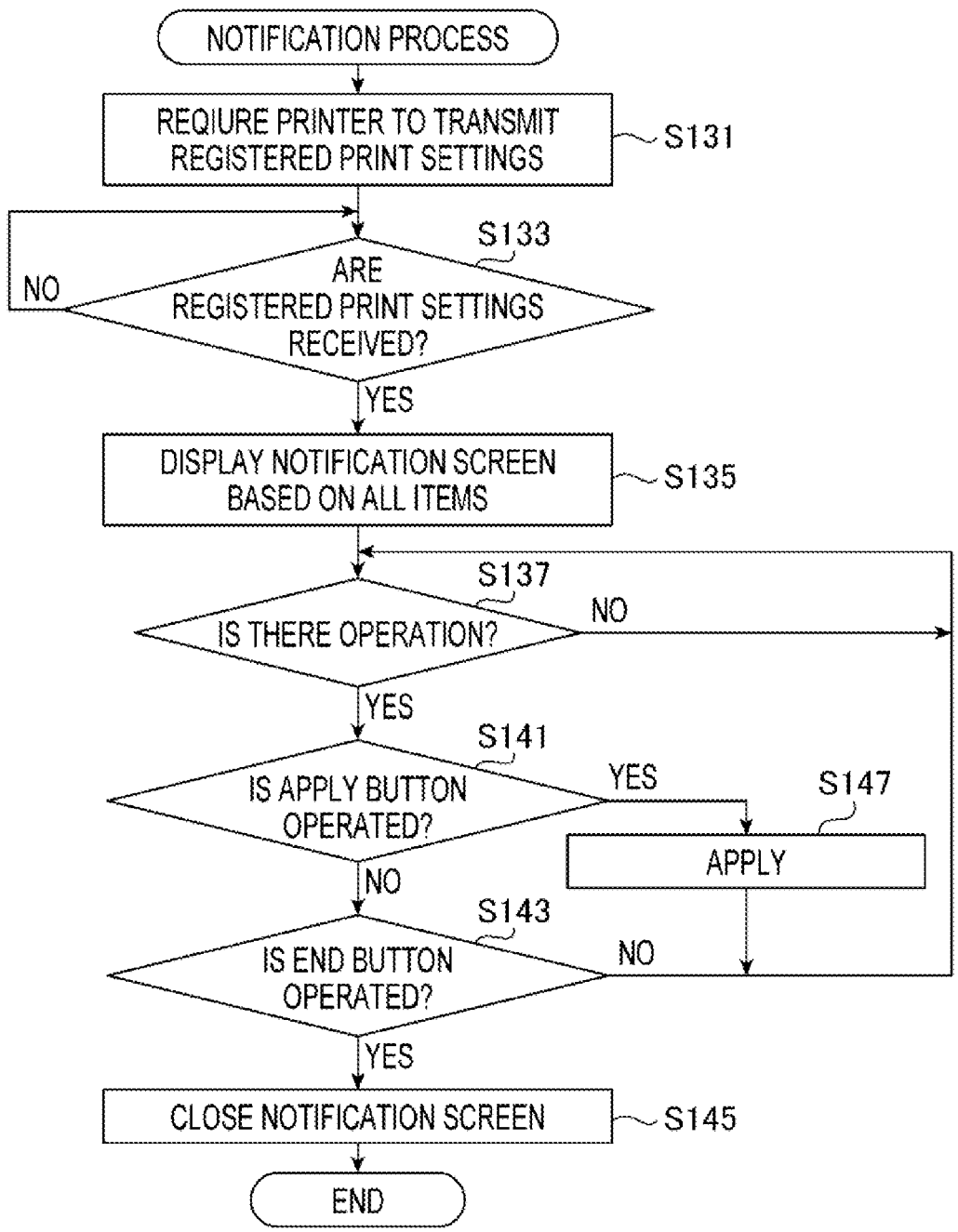
FIG. 10 is a flowchart illustrating a notification process.

As shown in FIG. 10, the CPU 11 pauses with the notification screen 300 displayed (S137: NO) until the CPU 11 receives an operation via the user IF 13. When the operation of the apply button 323 on the notification screen 300 is received via the user IF 13 (S137: YES; S141: YES), the CPU 11 applies the registered print settings displayed on the notification screen 300 to the print settings on the detailed setting screen 230 (S147), and returns to a process in S137. Before the apply button 323 is operated, "No" is set for aggregate printing in the detailed setting screen 230 as shown in FIG. 3, while, when the apply button 323 is operated with "2 in1" being set for the aggregate printing on the notification screen 300, as shown in FIG. 11, the CPU 11 changes the setting of the aggregate printing on the detailed setting screen 230 from "No" to "2 in2." Then, the registered print settings are reflected in a batch to the print settings on the detailed setting screen 230. Therefore, when the user wishes to use the registered print settings of the printer 2, there is no need to set each item individually in order to match the registered print settings.

Further, when the CPU 11 receives, via the user IF 13 the operation of the end button 321 on the notification screen 300 (S103 7: YES; S141: NO; and S143: YES), the CPU 11 closes the notification screen 300 (S145), and terminates the notification process.

As shown in FIG. 2, when receiving a print execution instruction from the user via the print setting screen (A61), the editing application 43 passes the print instruction to the general-use printing program 41 (A62). The general-use printing program 41 obtains, in response to the print instruction, information indicating image data to be printed and information indicating the print settings. The print settings include the print settings received via the detailed setting screen 230.

When, for example, the aggregate printing is set to 2-in-1, the supporting program 42 processes the intermediate image data so that two images are aggregated into one image. When the duplex printing is set to "Yes," the supporting program 42 processes the intermediate image data so that one image is reversed with respect to the other image. For another example, when the composite printing is set to "Yes" and the image of "CONFIDENTIAL" is selected as the composite image, the supporting program 42 processes the intermediate image data to synthesize data representing the image of "CONFIDENTIAL" with the intermediate image data. Then, the supporting program 42 rasterizes the processed intermediate image data to generate the print data.

The supporting program 42 is provided with a conversion table for converting the RGB values to the CMYK values. For example, the supporting program 42 also has a conversion table for converting RGB values to conversion table for converting RGB values to CMYK values. Further, the supporting program 42 receives the setting of a preferred hue (brightness, RGB value, and the like) for a particular color. The supporting program 42 can receive settings for color correction via the detailed setting screen 230. When the color correction is set to "Yes," the supporting program 42 corrects the conversion table in accordance with the setting. Then, when rasterizing the intermediate image data to generate print data, the supporting program 42 converts the RGB values of the particular color designated in the print instruction to CMYK values based on the corrected conversion table. The supporting program 42 then converts the RGB values of the specific color specified in the printed image to CMYK values based on the corrected conversion table.

When the print settings include settings for the non-image processing items, i.e., the settings for the sheet tray, the sheet discharge tray, the duplex printing, the color printing, the eco mode, and the accumulation printing, the supporting program 42 generates print data to which commands to cause the printer to perform printing operations based on the above settings for the non-image processing items. The eco mode is a mode in which the conveyance speed at which the paper is conveyed during printing is slowed down to reduce the noise generated during printing. The accumulation printing is a method according to which the printer 2 does not immediately print the print data received from an external device such as the PC 1, but accumulate the print data in the memory of the printer 2, and when the printer 2 receives an instruction to execute printing via the operation panel, the printer 2 prints the accumulated print data. The accumulation printing may be a secure printing according to which the user is asked to enter user information such as a user ID and password, and when the user authentication is successful, the print execution instruction is accepted and printing is performed.

As described in detail above, according to the above-described embodiment, the supporting program 42 obtains the registered print settings registered in the printer 2 from the printer 2 and notifies the registered print setting obtained from the printer with the detailed setting screen 230 being displayed. According to this configuration, the user can grasp the contents of the registered print settings on the PC 1 when selecting to follow the registered print settings on the detailed setting screen 230. Therefore, a possibility of user-unintended printing when printing according to the print settings registered in the printer 2 can be reduced.

Fourth Embodiment

Next, a fourth embodiment will be described. A printing system according to the fourth embodiment differs from the printing system of the first form in the display of the detailed setting screen and the method of notifying the registered print settings. In the following description, portions differ from the third embodiment will be focused, and for the configuration and processing that are common between the third embodiment and the fourth embodiment, reference numerals same as those of the third embodiment will be omitted as appropriate.

As shown in FIG. 12, each item of a detailed setting screen 1230 has, in addition to choices of settings that the printer 2 can support, a choice of following the registered print settings which are stored in the printer. For example, the sheet size print setting includes radio buttons for respectively selecting "A4" and "A3" and another radio button, "printer-side-setting follower button" to indicate that the printer should follow the sheet size of the registered print setting. Thus, it is possible to set whether or not to follow the print settings registered in the printer 2 for each item.

Further, the detailed setting screen 1230 has a printer-side-setting check button 1235 instead of the printer-side-setting follower button 235 shown in FIG. 8. The printer-side-setting check button 1235 is an operator to receive an instruction to display the registered print settings of the printer 2 on the user IF 13. The printer-side-setting check button 1235 is an example of a "particular operator."

In this embodiment, the screen operation reception process (see S105 of FIG. 9) according to the third embodiment is changed to a process of determining whether or not the printer-side-setting check button 1235 has been operated. Then, when the printer-side-setting check button 1235 has been operated, a notification instruction is output in S113. It is noted that the notification process executed when the notification instruction is received is different between the present embodiment and the third embodiment.

Figure 13:
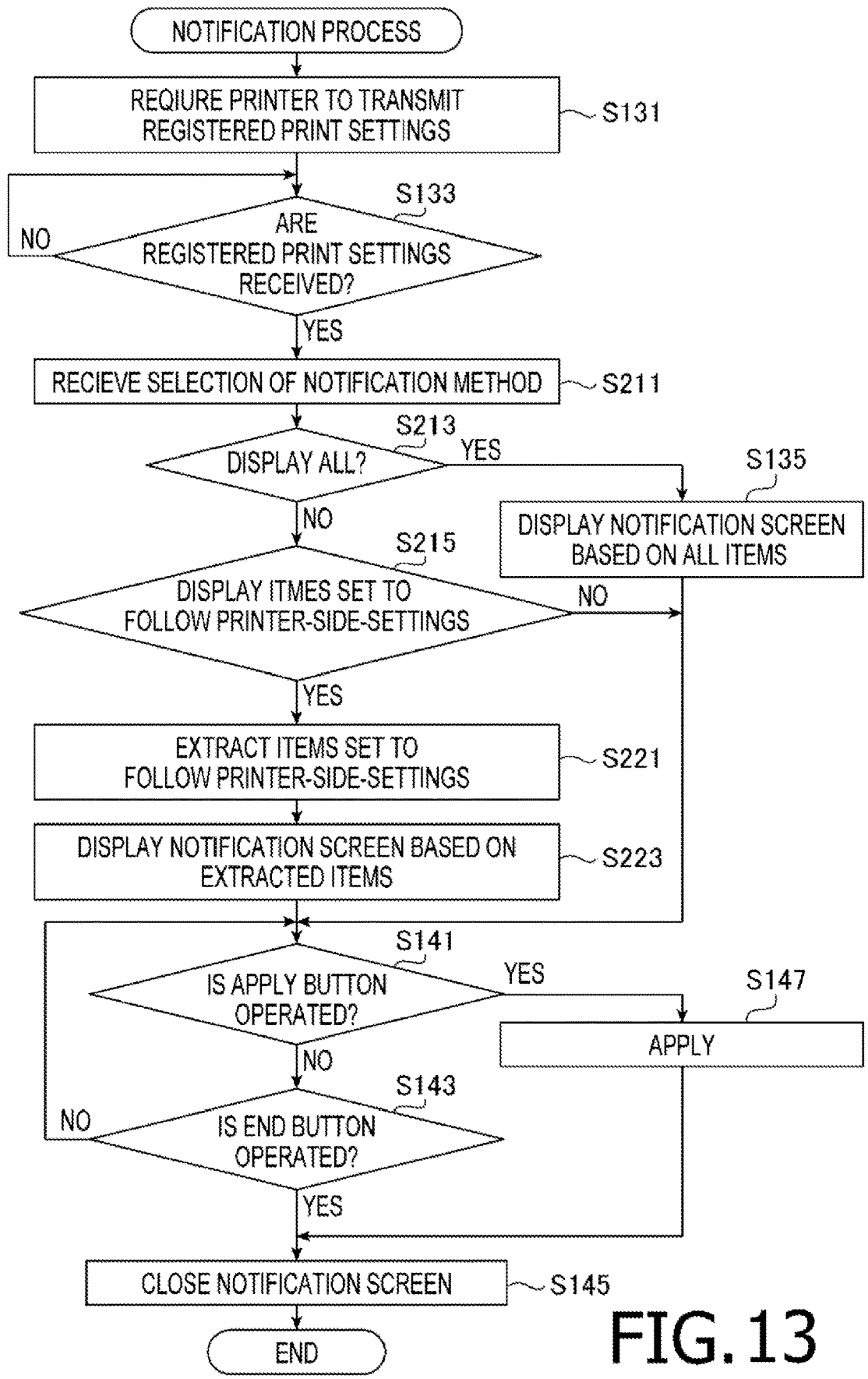
FIG. 13 is a flowchart illustrating another example of the notification process.

The notification process will be described referring to a flowchart shown in FIG. 13. As shown in FIG. 13, after obtaining the registered print settings from the printer 2 (S131, S133), the CPU 11 receives the selection of the notification method (S211). For example, the CPU 11 prompt the user to select a first notification method of displaying all the registered print settings obtained from the printer 2 on the user IF 13, or a second method of displaying only the print settings for which "follow the settings stored in the printer" is set among the print settings displayed on the detailed setting screen are displayed on the user IF 13.

When the first reporting method is selected via the user IF 13, the CPU 11 determines that all the settings are displayed (S213: YES). In this case, for example, as shown in FIG. 11, the CPU 11 displays the notification screen 300 based on all the items on the user IF 13 (S135) and proceeds to S141.

In this way, as all the setting items of the registered print settings are notified, the user can grasp all the setting items of the registered print settings, including the items set to follow the registered print settings. That is, the user can grasp the print settings registered in the printer 2 regarding not only the items set, via the detailed setting screen 1230, to indicate to follow the settings stored in the printer (e.g., sheet discharge tray, duplex printing, eco mode), but also the items that are not set to follow the settings stored in the printer (e.g., sheet size, number of copies, sheet feed tray, aggregate printing, toner mode, accumulation printing, and the like), and the items not displayed on the detailed setting screen 230 (e.g., sheet type, print quality, color correction, and the like).

When the second reporting method is selected via the user IF 13, the CPU 11 determines that only items set to follow the settings stored in the printer are to be displayed (S213: NO; S215: YES). In this case, the CPU 11 extracts the items, among the items displayed on the detailed setting screen 230, set to follow the settings stored in the printer (S221). Then, the CPU 11 displays (S223), on the user IF 13, the notification screen based on the items extracted in S223 and proceeds to S141.

Figure 14:
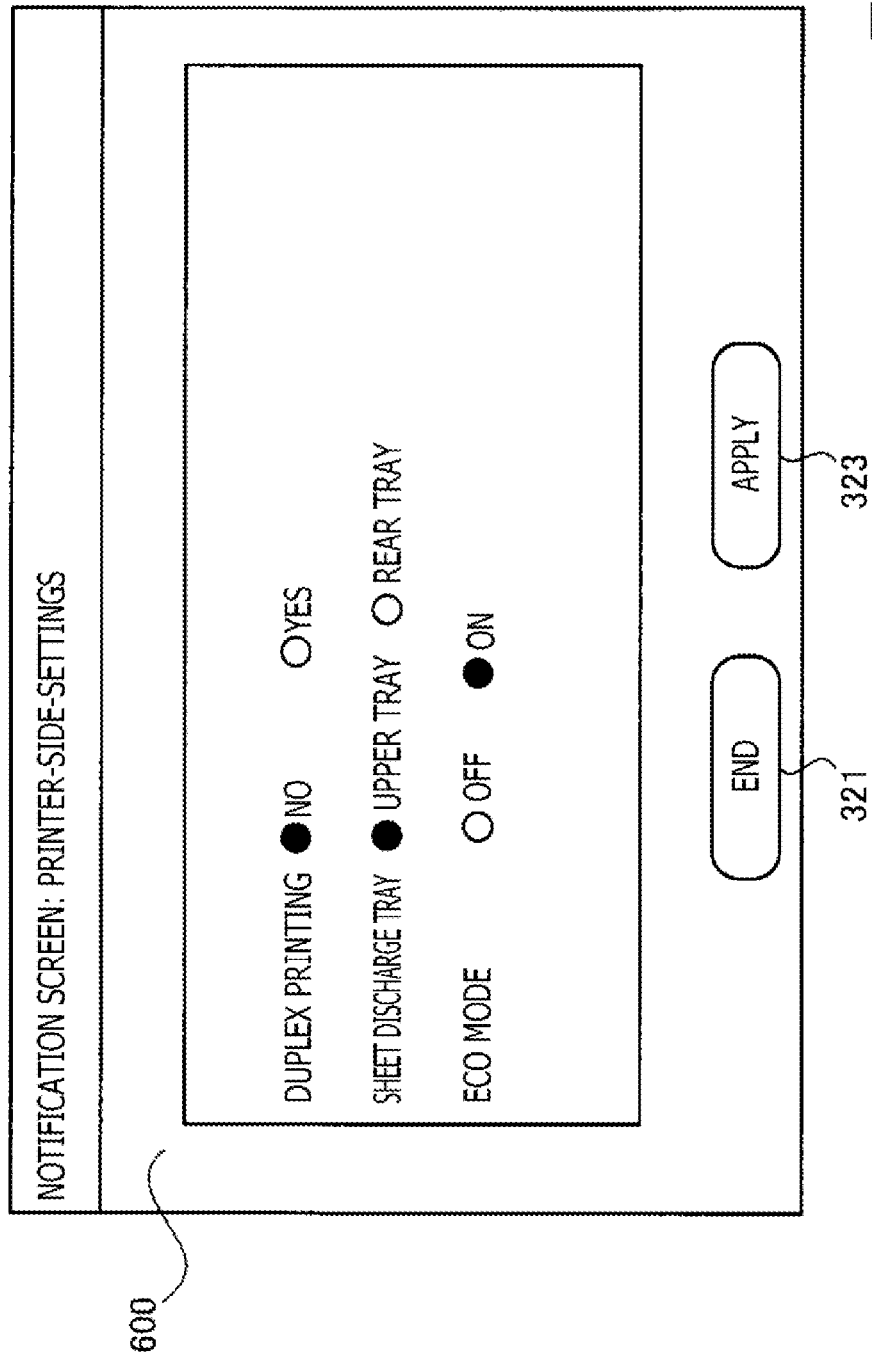
FIG. 14 shows another example of the notification screen.

It is assumed that, before printer-side-setting button 1235 is operated, the items "sheet discharge tray," "duplex print," and "eco mode" are set to "follow printer-side-setting" on the detailed setting screen 230 as shown in FIG. 12. In this case, as shown in FIG. 14, the CPU 11 displays, on the user IF 13, a notification screen 600 that displays the settings of "sheet discharge tray," "duplex printing," and "eco mode" among the registered print settings received in S133.

In this way, the notification screen 600, which displays only the items set to follow the settings stored in the printer, displays fewer items than the notification screen 300 (see FIG. 11), which notifies all the registered print settings. In addition, only the items that the user wants to print according to the print settings registered in the printer 2 can be displayed. Therefore, the user can easily grasp the items to be notified, and the possibility of user-unintended printing when printing according to the print settings registered in the printer 2 can be reduced.

In addition, since the user can select whether to display all or only the items set to follow the settings stored in the printer, a notification screen that follows the user's intention can be displayed on the user IF 13.

Fifth Embodiment

Next, a printing system according to the fifth embodiment will be described. The printing system according to the third embodiment is different from the third embodiment in the acquisition of the registered print setting, and a timing at which the notification screen displayed. Therefore, in the following description, portions that are different from the third embodiment will be focused, while the same reference numbers as those in the third embodiment are used in the drawings for the configuration and processing that are common to the first embodiment, and the description thereof is omitted where appropriate.

Figure 15:
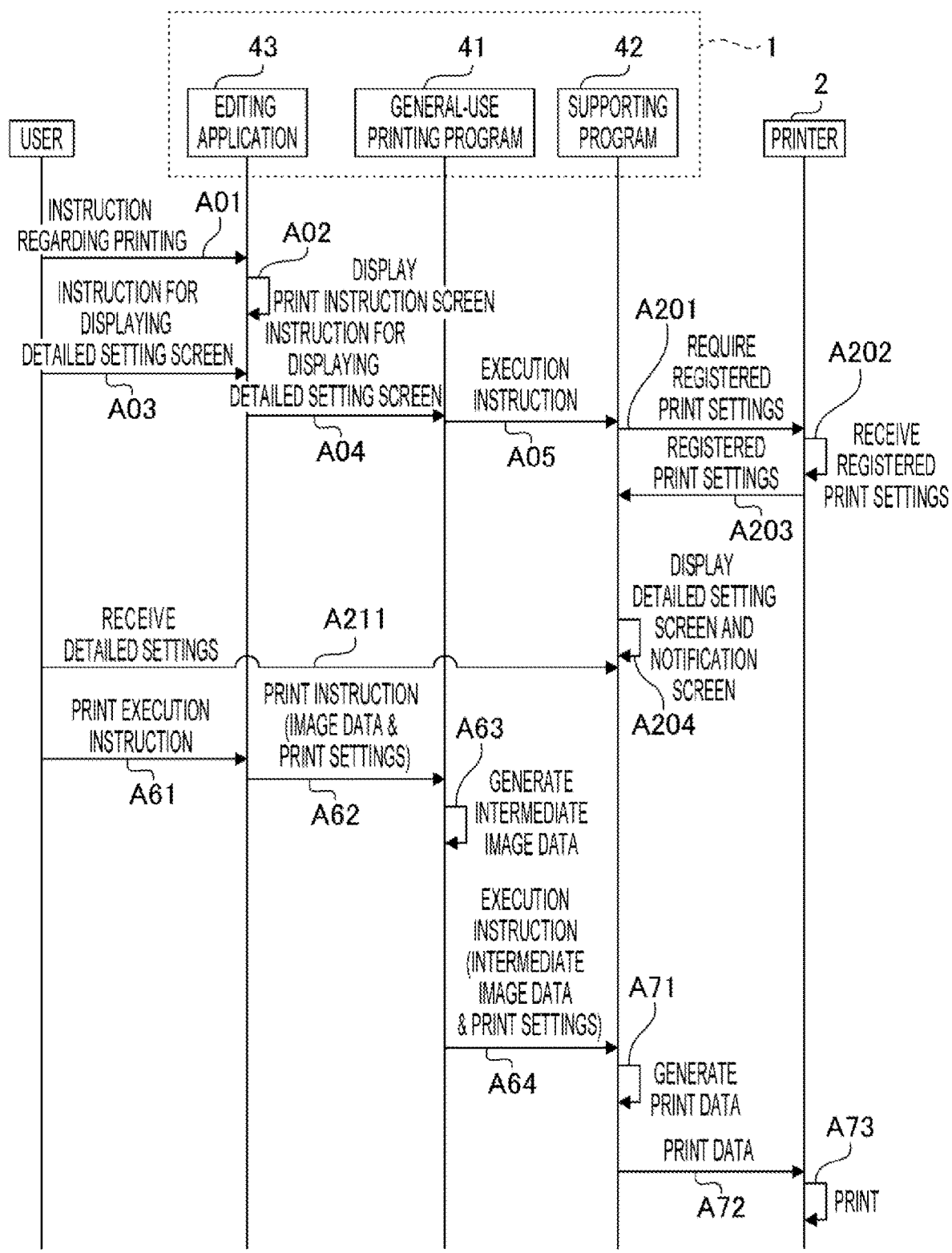
FIG. 15 is a sequence diagram illustrating another example of the printing operation performed by each program.

As shown in a sequence diagram shown in FIG. 15, when receiving the execution instruction that the general-use printing program 41 outputs in response to the receipt of a reception start instruction from the editing application 43 (A05), the supporting program 42 requests the printer 2 to transmit the registered print settings via the communication IF 14 (A201). Then, the printer 2, in response to the request, reads out the registered print settings from the non-volatile memory (A202), and responds to the PC 1 by transmitting the registered print settings read out of the non-volatile memory to the PC 1. After receiving the registered print settings transmitted from the printer 2 via the communication IF 14 (A203), the supporting program 42 displays the detailed setting screen 230 and the notification screen 300 (A204). Then, the supporting program 42 receives the detailed settings via the detailed setting screen 230 (A211).

As above, according to the third embodiment, the supporting program 42 obtains the registered print settings from the printer before displaying the detailed setting screen 230, and notifies, from the beginning, the registered print settings via the notification screen 300 when displaying the detailed setting screen 230. According to such a configuration, as in the third and fourth embodiments, the user can determine whether or not to set the print settings to follow the print settings stored in the printer after considering the contents of the registered print settings when the print settings are made on the PC 1. Therefore, the possibility of user-unintended printing when printing is performed according to the print settings registered in the printer 2 can be reduced.

The embodiments disclosed herein are merely examples and do not limit the invention in any way. Therefore, the technology disclosed herein can naturally be improved and/or modified in various ways within aspects of the present disclosure, but not deviating therefrom. For example, the device connected to the PC 1 is not necessarily limited to a printer, but can be a multifunctional peripheral, a copier, a facsimile machine, or any other device having a printing function. The number of printers connected to the PC1 is not necessarily limited to the example shown in the drawings, but can be two or more.

In the above embodiment, the supporting program 42 obtains all the registered print settings registered in the printer 2. In contrast, as shown in FIG. 12, when the setting to follow the settings registered in the printer on an item basis, the supporting program 42 may obtain the registered print settings from the printer 2 only for the items that are set to follow the settings of the printer, and display the obtained registered print settings on the notification screen. Optionally, the supporting program 42 may individually obtain the registered print setting corresponding to the item related to a radio button from the printer 2 each time a radio button indicating to follow the setting stored in the printer is selected. It is noted, however, by obtaining the registered print settings in a batch upon operation of the printer-side-setting check button 1235 as in the above embodiment, the communication time with the printer 2 can be shortened.

In the second embodiment described above, the user can select the method of notification, but the method of notification may be the same.

The printing system may be configured such that the print settings set on the detailed setting screen 230 cannot be registered to the printer 2 from the PC 1. In other words, the printing system may be configured such that the registered print settings of the printer 2 cannot be changed from the PC 1. It is noted, however, since the registered print settings of the printer 2 can be updated from the PC 1, it is possible to save time and effort for registering the print settings by operating the printer 2.

The image processing process to process images according to the print settings may not be performed by the supporting program 42, but by the general-use printing program 41 or the printer 2. However, by making at least the items related to processes performed by the supporting program 42, among the setting items of the print settings, the target of the registered print settings, a possibility of user-unintended printing can be reduced.

The detailed setting screens 230 and 1230 respectively shown in FIG. 8 and FIG. 12, and the notification screens 300 and 600 respectively shown in FIGS. 11 and 14 are all examples, and aspects of the present disclosures are not necessarily limited to the configurations. For example, the items displayed on the detailed setting screen 230 and 1230 and the notification screens 300 and 600 are not necessarily limited to those shown in the drawings.

What is claimed is:

1. A non-transitory computer-readable recording medium containing computer-executable instructions realizing a supporting program executable for a computer of an information processing device to which a printer is connectable, the printer storing particular print settings, the supporting program being configured to support a general-use printing program implemented, in advance, in an operating system of the information processing device,
wherein the computer-executable instructions of the supporting program cause, when executed by the computer, the information processing device to perform:
obtaining, from the printer, the particular print settings stored in the printer,
wherein an editing application is implemented in the information processing device separately from the general-use printing program, the editing application being an application configured to edit image data, and
wherein when the editing application outputs, to the general-use printing program, a display instruction instructing the general-use printing program to display a setting screen used to receive print settings to be used for printing by the printer, and the general-use printing program outputs, to the supporting program, an execution instruction in response to the display instruction, the computer-executable instructions further cause, when executed by the computer, the information processing device to perform;
displaying the setting screen with use of a displaying the setting screen with use of a user interface of the information processing device; and
reflecting the particular print settings obtained in the obtaining to the setting screen.

2. The non-transitory computer-readable recording medium according to claim 1,
wherein the particular print settings stored in the printer are default print settings, and
wherein the printer is configured to change current print settings to the default pint settings in response to receipt of instructions to set the print settings to an initial state.

3. The non-transitory computer-readable recording medium according to claim 2,
wherein the information processing device performs the reflecting in response to receipt of the display instruction, and
wherein the setting screen in which the default print settings obtained in the obtaining are reflected in the reflecting is displayed via the user interface in the displaying.

4. The non-transitory computer-readable recording medium according to claim 2,
wherein the information processing device performs the reflecting in response to an operation of a particular operator displayed on the setting screen.

5. The non-transitory computer-readable recording medium according to claim 2,
wherein the computer-executable instructions further cause, when executed by the computer, the information processing device to perform caching the default print settings obtained in the obtaining in a memory of the information processing device;
wherein, in the reflecting, the information processing device performs:
when the default print settings are not stored in the memory:
the obtaining;
after the obtaining, reflecting the obtained default print settings to the setting screen; and
the caching; and
when the default print settings are stored in the memory:
reading out the default print settings obtained in the obtaining from the memory; and
reflecting the read out default print settings to the setting screen.

6. The non-transitory computer-readable recording medium according to claim 2,
wherein, when there is a print instruction instructing the general-use printing program to cause the printer to print images and output by the editing application implemented in the information processing device, the instructions further cause, when executed, the computer to perform:

receiving image data subjected to printing by the print instruction from the general-use printing program; and processing the received image in accordance with the print settings set on the setting screen, wherein the default print settings include an item regarding processing of the image in the processing.

7. The non-transitory computer-readable recording medium according to claim 6, wherein, among the print settings set in the setting screen, the item regarding processing of the image in the processing includes a setting of RGB values of a raster image when the raster image is generated based on the image data received from the general-use printing program.

8. The non-transitory computer-readable recording medium according to claim 6, wherein, among the print settings set in the setting screen, the item regarding processing of the image in the processing includes a setting of reducing thickness of an image when a raster image is generated based on the image data received from the general-use printing program.

9. The non-transitory computer-readable recording medium according to claim 6, wherein, among the print settings set in the setting screen, the item regarding processing of the image in the processing includes a setting of correcting a conversion table to be used when particular RGB values are converted into CMYK values.

10. The non-transitory computer-readable recording medium according to claim 1, wherein the printer is configured to accept registration of the particular print settings as registered print settings and store the registered print settings, wherein a choice receivable via the setting screen includes a setting to follow the registered print settings.

11. The non-transitory computer-readable recording medium according to claim 10, wherein the information processing device performs the obtaining and the displaying in response to receipt of the display instruction.

12. The non-transitory computer-readable recording medium according to claim 10, wherein the information processing device performs the obtaining and the displaying in response to the setting to follow the registered print settings being received in the setting screen.

13. The non-transitory computer-readable recording medium according to claim 10, wherein the information processing device performs the obtaining and the displaying in response to an operation of a particular operator displayed on the setting screen.

14. The non-transitory computer-readable recording medium according to claim 10, wherein, in the displaying, the information processing device display all setting items of the registered print setting obtained in the obtaining.

15. The non-transitory computer-readable recording medium according to claim 10, wherein, in the setting screen, each item of the print settings is settable whether to follow the registered print setting, and wherein, in the displaying, the information processing device display an item which is set to follow the registered print setting among setting items of the registered print setting obtained in the obtaining.

16. The non-transitory computer-readable recording medium according to claim 10, wherein the computer-executable instructions further cause, when executed by the computer, the information processing device to perform:

receiving a registration instruction to register a currently set print setting via the user interface while the setting screen is displayed; and when receiving the registration instruction, output, to the printer, a registration command to instruct to register a print setting set in the setting screen, wherein the registration command includes information indicating the print setting set in the setting screen, and wherein the printer is configured to update the registered print setting with the information included in the registration command when receiving the registration command.

17. The non-transitory computer-readable recording medium according to claim 10, wherein, when there is a print instruction instructing the general-use printing program to cause the printer to print images and output by the editing application implemented in the information processing device, the instructions further cause, when executed, the computer to perform:

receiving image data subjected to printing by the print instruction from the general-use printing program; and processing the received image in accordance with the print settings set on the setting screen, wherein the registered print setting includes an item regarding processing of the image in the processing.

18. A printing system, comprising:

an information processing device including a supporting program executable by a computer of an information processing device, the supporting program being configured to support a general-use printing program implemented, in advance, in an operating system of the information processing device; and a printer in which particular print settings are stored, wherein the printer is configured to change currently set print settings to the particular print settings in response to receipt of an instruction to change a state of the print settings to a particular state, and wherein the supporting program of the information processing device is configured to perform:

obtaining, from the printer, the particular print settings stored in the printer, wherein an editing application is implemented in the information processing device separately from the general-use printing program, the editing application being an application configured to edit image data, and wherein when the editing application outputs, to the general-use printing program, a display instruction instructing the general-use printing program to display a setting screen used to receive print settings to be used for printing by the printer, and the general-use printing program outputs, to the supporting program, an execution instruction in response to the display instruction, the supporting program of the information processing device is further configured to perform;

displaying the setting screen with use of a displaying the setting screen with use of a user interface of the information processing device; and reflecting the particular print settings obtained in the obtaining to the setting screen.

19. The printing system according to claim 18,
wherein the particular print settings stored in the printer are default print settings, and
wherein the printer is configured to change current print settings to the default pint settings in response to receipt of instructions to set the print settings to an initial state.

20. The printing system according to claim 18,
wherein the printer is configured to accept registration of the particular print settings as registered print settings and store the registered print settings,
wherein a choice receivable via the setting screen includes a setting to follow the registered print settings.

\* \* \* \* \*